United States Patent
Yu et al.

(10) Patent No.: US 11,218,272 B2
(45) Date of Patent: Jan. 4, 2022

(54) INFORMATION TRANSMISSION METHOD AND APPARATUS

(71) Applicant: Huawei Technologies Co., Ltd., Shenzhen (CN)

(72) Inventors: Zheng Yu, Beijing (CN); Xiangdong Zhang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/696,659

(22) Filed: Nov. 26, 2019

(65) Prior Publication Data

US 2020/0099494 A1    Mar. 26, 2020

Related U.S. Application Data

(63) Continuation of application No. 15/588,274, filed on May 5, 2017, now Pat. No. 10,505,690, which is a
(Continued)

(51) Int. Cl.
*H04L 5/00* (2006.01)
*H04W 16/14* (2009.01)
(Continued)

(52) U.S. Cl.
CPC ............ *H04L 5/0053* (2013.01); *H04L 5/005* (2013.01); *H04L 5/0041* (2013.01); *H04W 4/70* (2018.02);
(Continued)

(58) Field of Classification Search
None
See application file for complete search history.

(56) References Cited

U.S. PATENT DOCUMENTS

2011/0274074 A1* 11/2011 Lee .................. H04L 5/0053
                                                             370/329
2012/0099515 A1    4/2012 Chen et al.
(Continued)

FOREIGN PATENT DOCUMENTS

CN    101772181 A    7/2010
CN    101772185 A    7/2010
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.3.0, pp. 1-378, 3rd Generation Partnership Project, Valbonne, France (Sep. 2014).
(Continued)

*Primary Examiner* — Charles C Jiang
*Assistant Examiner* — Saad Khawar
(74) *Attorney, Agent, or Firm* — Leydig, Voit & Mayer, Ltd.

(57) ABSTRACT

Embodiments of the present disclosure provide an information transmission method and an apparatus, where the information transmission method includes: determining, by a base station, a first transmission resource; sending, by the base station, first information using the first transmission resource, where the first information includes at least one of system information or control information for scheduling system information; determining, by the base station, at least one second transmission resource; and sending, by the base station, second information to UE by using the second transmission resource, where the second information includes at least one of: a paging message, a random access response message, a contention resolution message, control information for scheduling a paging message, control infor-
(Continued)

mation for scheduling a random access response message, or control information for scheduling a contention resolution message.

20 Claims, 13 Drawing Sheets

Related U.S. Application Data continuation of application No. PCT/CN2014/090647, filed on Nov. 7, 2014.

(51) Int. Cl.
*H04W 4/70* (2018.01)
*H04W 76/15* (2018.01)
*H04W 72/12* (2009.01)
*H04W 48/12* (2009.01)
*H04W 74/00* (2009.01)

(52) U.S. Cl.
CPC ....... *H04W 16/14* (2013.01); *H04W 72/1289* (2013.01); *H04W 76/15* (2018.02); *H04W 48/12* (2013.01); *H04W 74/006* (2013.01)

(56) References Cited

U.S. PATENT DOCUMENTS

| | | | | |
|---|---|---|---|---|
| 2012/0163305 | A1* | 6/2012 | Nimbalker | H04W 52/0206 370/329 |
| 2013/0003692 | A1* | 1/2013 | Nishio | H04L 5/001 370/329 |
| 2013/0182680 | A1 | 7/2013 | Choi et al. | |
| 2014/0044074 | A1 | 2/2014 | Chen et al. | |
| 2014/0098663 | A1 | 4/2014 | Vos et al. | |
| 2014/0307697 | A1 | 10/2014 | Beale | |
| 2014/0307698 | A1 | 10/2014 | Beale | |
| 2014/0328302 | A1* | 11/2014 | Park | H04W 72/08 370/329 |
| 2014/0355493 | A1 | 12/2014 | Niu et al. | |
| 2014/0376486 | A1 | 12/2014 | Lee et al. | |
| 2015/0358996 | A1 | 12/2015 | Fang et al. | |

FOREIGN PATENT DOCUMENTS

| | | |
|---|---|---|
| CN | 102026372 A | 4/2011 |
| CN | 102158981 A | 8/2011 |
| CN | 102238752 A | 11/2011 |
| CN | 102651853 A | 8/2012 |
| CN | 103427970 A | 12/2013 |
| CN | 103458509 A | 12/2013 |
| CN | 103929779 A | 7/2014 |
| CN | 103988559 A | 8/2014 |
| CN | 103999398 A | 8/2014 |
| CN | 104054295 A | 9/2014 |
| EP | 2765801 A1 | 8/2014 |
| JP | 5447731 B1 | 3/2014 |
| WO | 2013093436 A1 | 6/2013 |
| WO | 2013116972 A1 | 8/2013 |
| WO | 2013125922 A1 | 8/2013 |
| WO | 2014000174 A1 | 1/2014 |
| WO | 2014056345 A1 | 4/2014 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.3.0, pp. 1-215, 3rd Generation Partnership Project, Valbonne, France (Sep. 2014).

"3rd Generation Partnership Project; Technical Specification Group Radio Access Network; Evolved Universal Terrestrial Radio Access (E-UTRA); Physical layer procedures (Release 12)," 3GPP TS 36.213 V12.3.0, pp. 1-212, 3rd Generation Partnership Project, Valbonne, France (Sep. 2014).

"3rd Generation Partnership Project; Technical Specification Group Radio Access Network; Evolved Universal Terrestrial Radio Access (E-UTRA); Physical channels and modulation (Release 12)," 3GPP TS 36.211 V12.3.0, pp. 1-124, 3rd Generation Partnership Project, Valbonne, France (Sep. 2014).

"Summary of email discussion on Low Cost UE scheduling Options", 3GPP TSG RAN WG1 #76bis, Shenzhen, China, R1-141171, pp. 1-22, 3rd Generation Partnership Project, Valbonne, France (Mar. 31-Apr. 4, 2014).

"Design of EPDCCH Search Space for low cost MTC", 3GPP TSG RAN WG1 Meeting #78bis, Ljubljana, Slovenia, R1-144147, pp. 1-4, 3rd Generation Partnership Project, Valbonne, France (Oct. 6-10, 2014).

U.S. Appl. No. 15/588,274, filed May 5, 2017.

Zhao et al., "Study on the Random Access Procedure of TD-LTE," Journal of Nanjing University of Posts and Telecommunications (Natural Science), vol. 33, No. 5, Total 6 pages (Oct. 2013). With English Abstract.

Zhang et al., "Access Control for Web Page Resources Based on Data Stream Filtration," 2010 International Conference on Computer Application and System Modeling (ICCASM 2010), pp. V15-390-V15-394, Institute of Electrical and Electronics Engineers, New York, New York (Oct. 2010).

"Count, re-count and late arrival in GERAN MBMS," 3GPP TSG GERAN2 #14, Munich, Germany, Tdoc G2-030736 (GP-030736), Total 5 pages, 3rd Generation Partnership Project, Valbonne, France (Apr. 7-11, 2003).

* cited by examiner

CONT.
FROM
FIG. 10A

The base station carries configuration information of the second transmission resource by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and sends the configuration information of the second transmission resource to the UE; and/or the base station carries second transmission resource information by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and sends the second transmission resource information to the UE, where the second transmission resource information is used to indicate the second transmission resource  S1005

The base station sends second information to the UE by using the second transmission resource, where the second information includes at least one of a paging message, a random access response message, a contention resolution message, control information for scheduling a paging message, control information for scheduling a random access response message, or control information for scheduling a contention resolution message  S1006

FIG. 10B

INFORMATION TRANSMISSION METHOD AND APPARATUS

CROSS-REFERENCE TO RELATED APPLICATION

This application is a continuation of U.S. patent application Ser. No. 15/588,274, filed on May 5, 2017, which is a continuation of International Application No. PCT/CN2014/090647, filed on Nov. 7, 2014. All of the afore-mentioned patent applications are hereby incorporated by reference in their entireties.

TECHNICAL FIELD

Embodiments of the present disclosure relate to the field of wireless communications technologies, and in particular, to an information transmission method and an apparatus.

BACKGROUND

In wireless communication, a base station needs to send system information to a user equipment (UE). The UE can obtain related network configuration information only after receiving the system information, so as to access the base station and communicate with the base station.

The system information sent by the base station to the UE includes system information such as a system information block (SIB) and/or a master information block (MIB). The system information is information broadcast by the base station to all UEs within a coverage area. The base station further sends, to the UE, information including paging information, a random access response (RAR) message, a contention resolution message, and the like. A feature of the information is: Although the information is broadcast by the base station to the UE, the base station may send the same information to a group of UEs, and the base station may send different information to multiple groups of UEs. In addition, the base station further needs to send control information for scheduling system information, control information for scheduling an RAR message, control information for scheduling a paging message, or control information for scheduling a contention resolution message to the UE.

Currently, with the development of machine-to-machine (M2M) technologies, there are multiple UEs of low complexity or low costs in a network. The UE of low complexity or low costs supports (radio frequency and/or baseband) bandwidth that is less than maximum carrier bandwidth stipulated in the system or is not greater than specific frequency bandwidth. When the UE of low complexity or low costs is served on a carrier whose bandwidth is greater than the bandwidth supported by the UE of low complexity or low costs, the UE can receive or send data on only one sub-band resource of the carrier at the same moment. If the base station transmits information such as system information, an RAR message, a paging message, or a contention resolution message (or control information for scheduling information such as system information, an RAR message, a paging message, or a contention resolution message) only on one sub-band resource of the carrier, a capacity of the information such as the RAR message, the paging message, or the contention resolution message (or the control information for scheduling information such as an RAR message, a paging message, or a contention resolution message) is limited.

For increasing the capacity of the information such as the RAR message, the paging message, or the contention resolution message (or the control information for scheduling information such as an RAR message, a paging message, or a contention resolution message), the base station transmits the information such as the system information, the RAR message, the paging message, or the contention resolution message (or the control information for scheduling information such as system information, an RAR message, a paging message, or a contention resolution message) on all sub-band resources of the carrier. However, consequently, the base station sends much repeated system information (or control information for scheduling system information), a system resource is wasted, and power consumption of the base station is increased.

In addition, in a carrier aggregation scenario, when multiple carriers are configured for a base station, information such as system information, an RAR message, a paging message, or a contention resolution message (or control information for scheduling information such as system information, an RAR message, a paging message, or a contention resolution message) is transmitted only on a primary component carrier. Therefore, a problem of a limited capacity still exists.

SUMMARY

Embodiments of the present disclosure provide an information transmission method and an apparatus. A first transmission resource and at least one second transmission resource are determined, first information is sent by using the first transmission resource, and second information is sent by using the second transmission resource. In this way, a base station can send the first information and the second information by using different transmission resources, so as to avoid repeated sending of the first information in addition to resolving a limited capacity of the second information, so that a system resource is saved.

A first aspect provides a base station, including:

a processing module, configured to determine a first transmission resource; and a sending module, configured to send first information by using the first transmission resource, where the first information includes at least one of system information or control information for scheduling system information; where the processing module is further configured to determine at least one second transmission resource; and the sending module is further configured to send second information to UE by using the second transmission resource, where the second information includes at least one of: a paging message, a random access response message, a contention resolution message, control information for scheduling a paging message, control information for scheduling a random access response message, or control information for scheduling a contention resolution message.

With reference to the first aspect, in a first possible implementation manner of the first aspect, the first transmission resource includes a first frequency resource, and the second transmission resource includes a second frequency resource.

With reference to the first possible implementation manner of the first aspect, in a second possible implementation manner of the first aspect, the first frequency resource is a first carrier, the second frequency resource is a second carrier, and the first carrier and the second carrier are carriers that are different in frequency; or the first frequency resource is a first sub-band resource on a third carrier, the second frequency resource is a second sub-band resource on the third carrier, and the first sub-band resource and the second sub-band resource are sub-band resources that are different in frequency.

With reference to any one of the first aspect to the second possible implementation manner of the first aspect, in a third possible implementation manner of the first aspect, the processing module is specifically configured to: determine the first transmission resource according to a system parameter, where the system parameter includes one or more of a system radio frame number, a subframe number, system bandwidth, configuration information of the first transmission resource, a frequency hopping pattern, a transmission period of the system information, transmission time resource information of the system information, or a resource scheduling granularity; or determine the first transmission resource according to preset information.

With reference to any one of the first aspect to the third possible implementation manner of the first aspect, in a fourth possible implementation manner of the first aspect, the sending module is further configured to: carry the configuration information of the first transmission resource by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and send the configuration information of the first transmission resource to the UE; and/or carry first transmission resource information by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and send the first transmission resource information to the UE, where the first transmission resource information is used to indicate the first transmission resource.

With reference to any one of the first aspect to the fourth possible implementation manner of the first aspect, in a fifth possible implementation manner of the first aspect, the processing module is specifically configured to: determine the at least one second transmission resource according to preset information; or determine the at least one second transmission resource according to one or more of the system parameter, configuration information of the second transmission resource, a UE specific parameter, or a UE group specific parameter; or determine the at least one second transmission resource according to transmission resource information of third information transmitted to the UE, where the third information is one or more of unicast data transmitted to the UE, control information that is used for scheduling unicast data and that is transmitted to the UE, response feedback information transmitted to the UE, or UE pilot information transmitted to the UE.

With reference to the fifth possible implementation manner of the first aspect, in a sixth possible implementation manner of the first aspect, the processing module determines the at least one second transmission resource according to the transmission resource information of the third information transmitted to the UE, and the processing module is further configured to determine to transmit the second information to the UE on a transmission resource for transmitting the third information to the UE.

With reference to any one of the first aspect to the sixth possible implementation manner of the first aspect, in a seventh possible implementation manner of the first aspect, the sending module is further configured to: carry the configuration information of the second transmission resource by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and send the configuration information of the second transmission resource to the UE; and/or carry second transmission resource information by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and send the second transmission resource information to the UE, where the second transmission resource information is used to indicate the second transmission resource.

With reference to the seventh possible implementation manner of the first aspect, in an eighth possible implementation manner of the first aspect, the sending module is further configured to send resource identification information to the UE, and the resource identification information is used to notify the UE that the second transmission resource is the same as the first transmission resource or the second transmission resource is determined according to the second transmission resource information.

With reference to the eighth possible implementation manner of the first aspect, in a ninth possible implementation manner of the first aspect, the sending module is specifically configured to: carry the resource identification information by using one or more of a synchronization channel, a physical broadcast channel, a physical control channel, a random access channel, preamble information, a master information block, a system information block, radio resource control common signaling, a random access response, a contention resolution message, radio resource control dedicated signaling, or media access control signaling, and send the resource identification information to the UE.

A second aspect provides user equipment, including:

a processing module, configured to determine a first transmission resource; and a receiving module, configured to receive, by using the first transmission resource, first information sent by a base station, where the first information includes at least one of system information or control information for scheduling system information; where the processing module is further configured to determine a second transmission resource; and the receiving module is further configured to receive, by using the second transmission resource, second information sent by the base station, where the second information includes at least one of: a paging message, a random access response message, a contention resolution message, control information for scheduling a paging message, control information for scheduling a random access response message, or control information for scheduling a contention resolution message.

With reference to the second aspect, in a first possible implementation manner of the second aspect, the first transmission resource includes a first frequency resource, and the second transmission resource includes a second frequency resource.

With reference to the first possible implementation manner of the second aspect, in a second possible implementation manner of the second aspect, the first frequency resource is a first carrier, the second frequency resource is a second carrier, and the first carrier and the second carrier are carriers that are different in frequency; or the first frequency resource is a first sub-band resource on a third carrier, the second frequency resource is a second sub-band resource on the third carrier, and the first sub-band resource and the second sub-band resource are sub-band resources that are different in frequency.

With reference to any one of the second aspect to the second possible implementation manner of the second aspect, in a third possible implementation manner of the second aspect, the processing module is specifically configured to: determine the first transmission resource according to a system parameter, where the system parameter includes one or more of a system radio frame number, a subframe number, system bandwidth, configuration information of the first transmission resource, a frequency hopping pattern, a transmission period of the system information, transmission time resource information of the system information, or a resource scheduling granularity; or determine the first transmission resource according to preset information.

With reference to any one of the second aspect to the third possible implementation manner of the second aspect, in a fourth possible implementation manner of the second aspect, the receiving module is further configured to: receive the configuration information that is of the first transmission resource and that is carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling; and/or receive first transmission resource information carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, where the first transmission resource information is used to indicate the first transmission resource.

With reference to any one of the second aspect to the fourth possible implementation manner of the second aspect, in a fifth possible implementation manner of the second aspect, the processing module is specifically configured to: determine the second transmission resource according to preset information; or determine the second transmission resource according to one or more of the system parameter, configuration information of the second transmission resource, a UE specific parameter, or a UE group specific parameter; or determine the second transmission resource according to transmission resource information of third information transmitted to the UE, where the third information is one or more of unicast data transmitted to the UE, control information that is used for scheduling unicast data and that is transmitted to the UE, response feedback information transmitted to the UE, or UE pilot information transmitted to the UE.

With reference to the fifth possible implementation manner of the second aspect, in a sixth possible implementation manner of the second aspect, the processing module determines the second transmission resource according to the transmission resource information of the third information transmitted to the UE, and the processing module is further configured to determine to receive the second information on a transmission resource for transmitting the third information to the UE.

With reference to any one of the second aspect to the sixth possible implementation manner of the second aspect, in a seventh possible implementation manner of the second aspect, the receiving module is further configured to: receive the configuration information that is of the second transmission resource and that is carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling; and/or receive second transmission resource information carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, where the second transmission resource information is used to indicate the second transmission resource.

With reference to the seventh possible implementation manner of the second aspect, in an eighth possible implementation manner of the second aspect, the receiving module is further configured to receive resource identification information sent by the base station, and the resource identification information is used to notify the UE that the second transmission resource is the same as the first transmission resource or the second transmission resource is determined according to the second transmission resource information.

With reference to the eighth possible implementation manner of the second aspect, in a ninth possible implementation manner of the second aspect, the receiving module is specifically configured to: receive the resource identification information carried by the base station by using one or more of a synchronization channel, a physical broadcast channel, a physical control channel, a random access channel, preamble information, a master information block, a system information block, radio resource control common signaling, a random access response, a contention resolution message, radio resource control dedicated signaling, or media access control signaling.

A third aspect provides an information transmission method, including:

determining, by a base station, a first transmission resource;

sending, by the base station, first information by using the first transmission resource, where the first information includes at least one of system information or control information for scheduling system information;

determining, by the base station, at least one second transmission resource; and sending, by the base station, second information to UE by using the second transmission resource, where the second information includes at least one of: a paging message, a random access response message, a contention resolution message, control information for scheduling a paging message, control information for scheduling a random access response message, or control information for scheduling a contention resolution message.

With reference to the third aspect, in a first possible implementation manner of the third aspect, the first transmission resource includes a first frequency resource, and the second transmission resource includes a second frequency resource.

With reference to the first possible implementation manner of the third aspect, in a second possible implementation manner of the third aspect, the first frequency resource is a first carrier, the second frequency resource is a second carrier, and the first carrier and the second carrier are carriers that are different in frequency; or the first frequency resource is a first sub-band resource on a third carrier, the second frequency resource is a second sub-band resource on the third carrier, and the first sub-band resource and the second sub-band resource are sub-band resources that are different in frequency.

With reference to any one of the third aspect to the second possible implementation manner of the third aspect, in a third possible implementation manner of the third aspect, the determining, by a base station, a first transmission resource includes:

determining, by the base station, the first transmission resource according to a system parameter, where the system parameter includes one or more of a system radio frame number, a subframe number, system bandwidth, configuration information of the first transmission resource, a frequency hopping pattern, a transmission period of the system information, transmission time resource information of the system information, or a resource scheduling granularity; or determining, by the base station, the first transmission resource according to preset information.

With reference to any one of the third aspect to the third possible implementation manner of the third aspect, in a fourth possible implementation manner of the third aspect, the method further includes:

carrying, by the base station, the configuration information of the first transmission resource by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and sending the configuration information of the first transmission resource to the UE; and/or carrying, by the base station, first transmission resource information by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and sending the first transmission resource information to the UE, where the first transmission resource information is used to indicate the first transmission resource.

With reference to any one of the third aspect to the fourth possible implementation manner of the third aspect, in a fifth possible implementation manner of the third aspect, the determining, by the base station, at least one second transmission resource includes:

determining, by the base station, the at least one second transmission resource according to preset information; or determining, by the base station, the at least one second transmission resource according to one or more of the system parameter, configuration information of the second transmission resource, a UE specific parameter, or a UE group specific parameter; or determining, by the base station, the at least one second transmission resource according to transmission resource information of third information transmitted to the UE, where the third information is one or more of unicast data transmitted to the UE, control information that is used for scheduling unicast data and that is transmitted to the UE, response feedback information transmitted to the UE, or UE pilot information transmitted to the UE.

With reference to the fifth possible implementation manner of the third aspect, in a sixth possible implementation manner of the third aspect, the determining, by the base station, the at least one second transmission resource according to transmission resource information of third information transmitted to the UE further includes:

determining, by the base station, to transmit the second information to the UE on a transmission resource for transmitting the third information to the UE.

With reference to any one of the third aspect to the sixth possible implementation manner of the third aspect, in a seventh possible implementation manner of the third aspect, the method further includes:

carrying, by the base station, the configuration information of the second transmission resource by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and sending the configuration information of the second transmission resource to the UE; and/or carrying, by the base station, second transmission resource information by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and sending the second transmission resource information to the UE, where the second transmission resource information is used to indicate the second transmission resource.

With reference to the seventh possible implementation manner of the third aspect, in an eighth possible implementation manner of the third aspect, the method further includes:

sending, by the base station, resource identification information to the UE, where the resource identification information is used to notify the UE that the second transmission resource is the same as the first transmission resource or the second transmission resource is determined according to the second transmission resource information.

With reference to the eighth possible implementation manner of the third aspect, in a ninth possible implementation manner of the third aspect, the sending, by the base station, resource identification information to the UE includes:

carrying, by the base station, the resource identification information by using one or more of a synchronization channel, a physical broadcast channel, a physical control channel, a random access channel, preamble information, a master information block, a system information block, radio resource control common signaling, a random access response, a contention resolution message, radio resource control dedicated signaling, or media access control signaling, and sending the resource identification information to the UE.

A fourth aspect provides an information transmission method, including:

determining, by UE, a first transmission resource;

receiving, by the UE by using the first transmission resource, first information sent by a base station, where the first information includes at least one of system information or control information for scheduling system information;

determining, by the UE, a second transmission resource; and receiving, by the UE by using the second transmission resource, second information sent by the base station, where the second information includes at least one of: a paging message, a random access response message, a contention resolution message, control information for scheduling a paging message, control information for scheduling a random access response message, or control information for scheduling a contention resolution message.

With reference to the fourth aspect, in a first possible implementation manner of the fourth aspect, the first transmission resource includes a first frequency resource, and the second transmission resource includes a second frequency resource.

With reference to the first possible implementation manner of the fourth aspect, in a second possible implementation manner of the fourth aspect, the first frequency resource is a first carrier, the second frequency resource is a second carrier, and the first carrier and the second carrier are carriers that are different in frequency; or the first frequency resource is a first sub-band resource on a third carrier, the second frequency resource is a second sub-band resource on the third carrier, and the first sub-band resource and the second sub-band resource are sub-band resources that are different in frequency.

With reference to any one of the fourth aspect to the second possible implementation manner of the fourth aspect, in a third possible implementation manner of the fourth aspect, the determining, by UE, a first transmission resource includes:

determining, by the UE, the first transmission resource according to a system parameter, where the system parameter includes one or more of a system radio frame number, a subframe number, system bandwidth, configuration information of the first transmission resource, a frequency hopping pattern, a transmission period of the system information, transmission time resource information of the system information, or a resource scheduling granularity; or determining, by the UE, the first transmission resource according to preset information.

With reference to any one of the fourth aspect to the third possible implementation manner of the fourth aspect, in a fourth possible implementation manner of the fourth aspect, the method further includes:

receiving, by the UE, the configuration information that is of the first transmission resource and that is carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling; and/or receiving, by the UE, first transmission resource information carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, where the first transmission resource information is used to indicate the first transmission resource.

With reference to any one of the fourth aspect to the fourth possible implementation manner of the fourth aspect, in a fifth possible implementation manner of the fourth aspect, the determining, by the UE, a second transmission resource includes:

determining, by the UE, the second transmission resource according to preset information; or determining, by the UE, the second transmission resource according to one or more of the system parameter, configuration information of the second transmission resource, a UE specific parameter, or a UE group specific parameter; or determining, by the UE, the second transmission resource according to transmission resource information of third information transmitted to the UE, where the third information is one or more of unicast data transmitted to the UE, control information that is used for scheduling unicast data and that is transmitted to the UE, response feedback information transmitted to the UE, or UE pilot information transmitted to the UE.

With reference to the fifth possible implementation manner of the fourth aspect, in a sixth possible implementation manner of the fourth aspect, the determining, by the UE, the second transmission resource according to transmission resource information of third information transmitted to the UE further includes:

determining, by the UE, to receive the second information on a transmission resource for transmitting the third information to the UE.

With reference to any one of the fourth aspect to the sixth possible implementation manner of the fourth aspect, in a seventh possible implementation manner of the fourth aspect, the method further includes:

receiving, by the UE, the configuration information that is of the second transmission resource and that is carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling; and/or receiving, by the UE, second transmission resource information carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, where the second transmission resource information is used to indicate the second transmission resource.

With reference to the seventh possible implementation manner of the fourth aspect, in an eighth possible implementation manner of the fourth aspect, the method further includes:

receiving, by the UE, resource identification information sent by the base station, where the resource identification information is used to notify the UE that the second transmission resource is the same as the first transmission resource or the second transmission resource is determined according to the second transmission resource information.

With reference to the eighth possible implementation manner of the fourth aspect, in a ninth possible implementation manner of the fourth aspect, the receiving, by the UE, resource identification information sent by the base station includes:

receiving, by the UE, the resource identification information carried by the base station by using one or more of a synchronization channel, a physical broadcast channel, a physical control channel, a random access channel, preamble information, a master information block, a system information block, radio resource control common signaling, a random access response, a contention resolution message, radio resource control dedicated signaling, or media access control signaling.

According to an information transmission method and an apparatus provided in the embodiments, a first transmission resource and at least one second transmission resource are determined, first information is sent by using the first transmission resource, and second information is sent by using the second transmission resource. The first information includes at least one of system information or control information for scheduling system information, and the second information includes at least one of: a paging message, a random access response message, a contention resolution message, control information for scheduling a paging message, control information for scheduling a random access response message, or control information for scheduling a contention resolution message. In this way, a base station can send the first information and the second information by using different transmission resources, so as to avoid repeated sending of the first information in addition to resolving a limited capacity of the second information, so that a system resource is saved.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

FIG. 10A and FIG. 10B are a flowchart of Embodiment 2 of an information transmission method according to an embodiment of the present disclosure;

DESCRIPTION OF EMBODIMENTS

Figure 1:
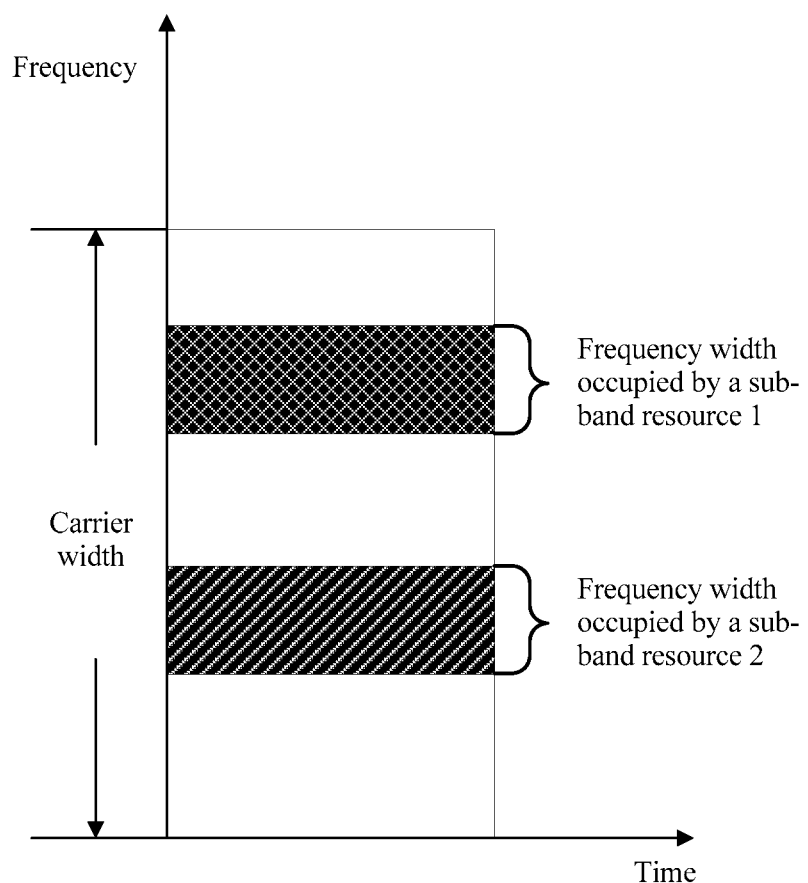
FIG. 1 is a schematic diagram of a resource of a carrier including multiple sub-bands.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

In wireless communication, bandwidth supported by UE of low complexity or low costs for signal receiving/sending is less than maximum carrier bandwidth stipulated in a system or specific carrier bandwidth. For example, in a current Long Term Evolution (LTE) communications system, totally six types of system bandwidth: 1.4 MHz, 3 MHz, 5 MHz, 10 MHz, 15 MHz, and 20 MHz are stipulated, but bandwidth supported by the UE of low complexity or low costs is usually less than 20 MHz. For example, signal bandwidth that can be supported by the UE of low complexity or low costs is 1.4 MHz or a frequency band width of N (N is a positive integer, for example, N=6) physical resource blocks (PRB). In the LTE system, one PRB occupies a frequency resource of 180 KHz.

For convenience, a frequency resource that can be supported or processed by the user equipment of low complexity or low costs may be referred to as a sub-band (in the present disclosure, the sub-band may be a narrow band). When the UE of low complexity or low costs is served, the UE may need to receive information on multiple sub-band resources. For example, the multiple sub-band resources are defined on a carrier whose bandwidth is greater than the bandwidth supported by the UE of low complexity or low costs. At the same moment, the UE of low complexity or low costs can receive or send information on only one sub-band resource. The sub-band resource refers to a frequency resource that occupies a specific frequency width on a carrier. For example, the sub-band may include one or more PRBs, or may include one or more subcarriers. Alternatively, a frequency resource width and a frequency resource location of the sub-band are predetermined or preconfigured. Usually, a frequency width occupied by one sub-band resource is not greater than the bandwidth that can be supported by the UE of low complexity or low costs. In the present disclosure, the UE of low complexity or low costs is used as an example of UE to describe implementation methods of embodiments of the present disclosure.

Unicast information in the present disclosure may be one or more of information scrambled by a cell radio network temporary identifier (C-RNTI), information scrambled by a semi-persist for scheduling cell radio network temporary identifier (SPS-RNTI), or information scrambled by a transmit power control radio network temporary identifier (TPC-RNTI).

System information and/or control information for scheduling system information in the present disclosure may be information that is same to all UEs in a cell. For example, the system information and/or the control information for scheduling system information may be information scrambled by a system information radio network temporary identifier (SI-RNTI).

Random access response information and/or control information for scheduling random access response information in the present disclosure may be information scrambled by a random access radio network temporary identifier (RA-RNTI).

A paging message and/or control information for scheduling a paging message in the present disclosure may be information scrambled by a paging radio network temporary identifier (P-RNTI).

A contention resolution message and/or control information for scheduling a contention resolution message in the present disclosure may be one or more of information scrambled by a temporary radio network temporary identifier (T-RNTI), information scrambled by a C-RNTI, information scrambled by an SPS-RNTI, or information scrambled by a TPC-RNTI.

As shown in FIG. 1, FIG. 1 is a schematic diagram of a resource of a carrier including multiple sub-bands, and in illustration of FIG. 1, a carrier including two sub-band resources is used as an example. In embodiments of the present disclosure, UE may know a frequency resource location of one or more sub-band resources on a carrier or in system bandwidth, or the UE may not know a frequency resource location of one or more sub-band resources on a carrier or in system bandwidth. This is not limited.

Figure 2:
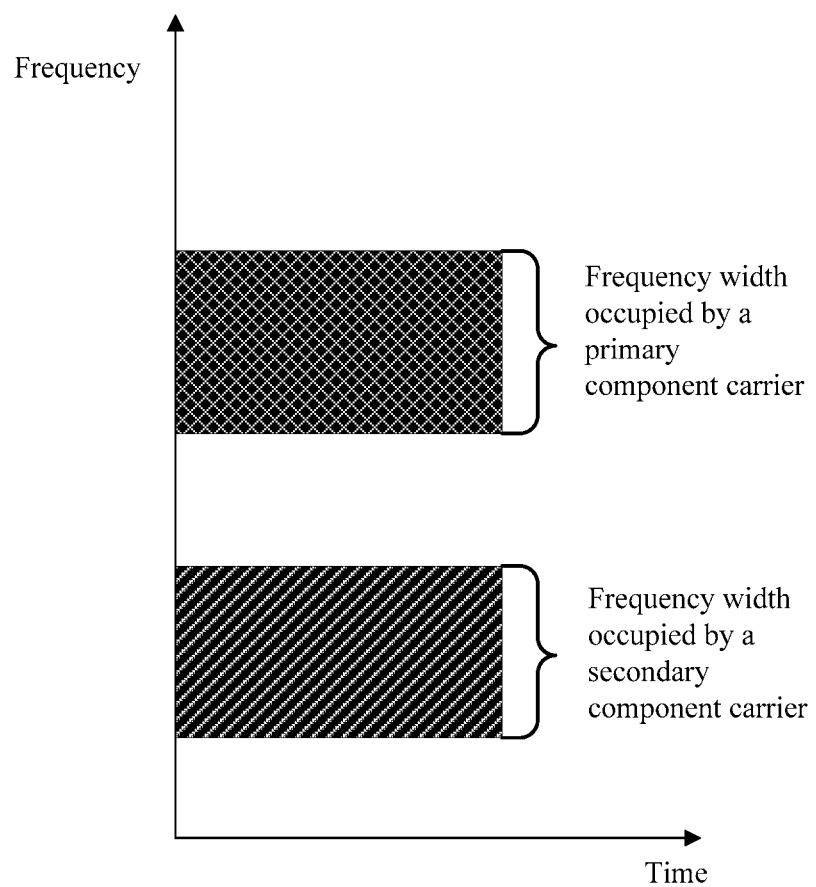
FIG. 2 is a schematic diagram of a resource in a carrier aggregation scenario.

In addition, in a carrier aggregation scenario, system bandwidth includes multiple carriers, including one primary component carrier and multiple secondary component carriers. As shown in FIG. 2, FIG. 2 is a schematic diagram of a resource in a carrier aggregation scenario, and in illustration of FIG. 2, two carriers are used as an example for carrier aggregation.

Figure 3:
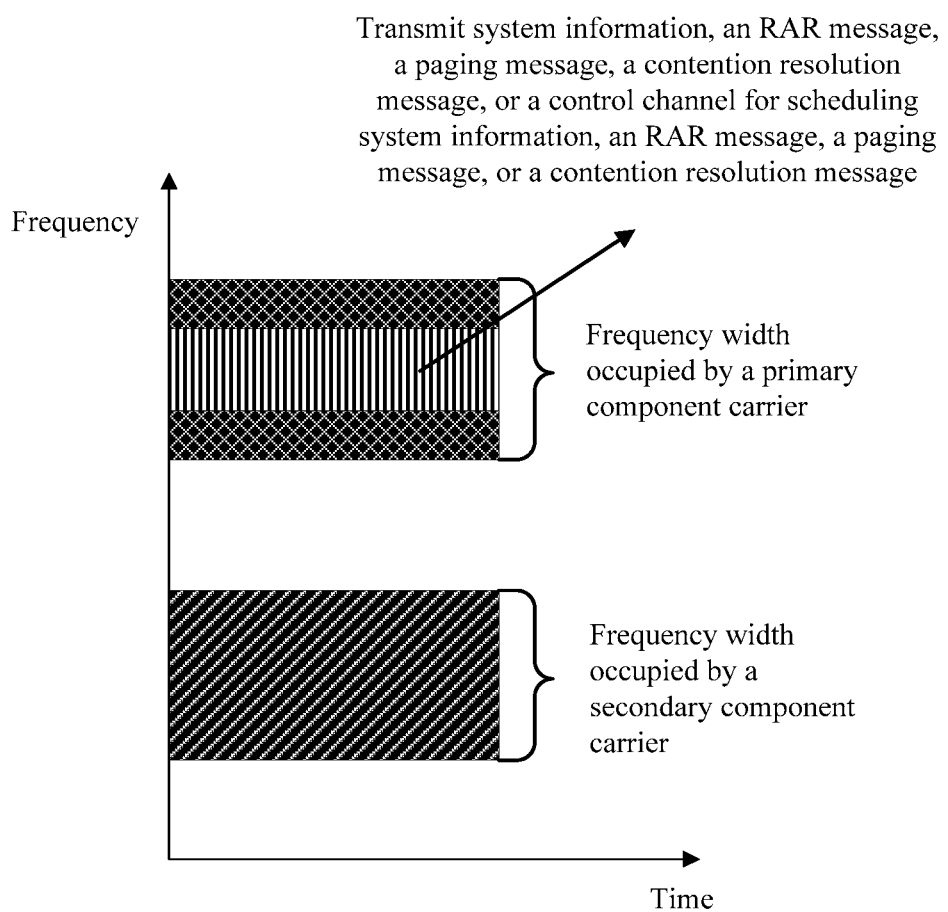
FIG. 3 is a schematic diagram of message sending in a carrier aggregation scenario.
Figure 4:
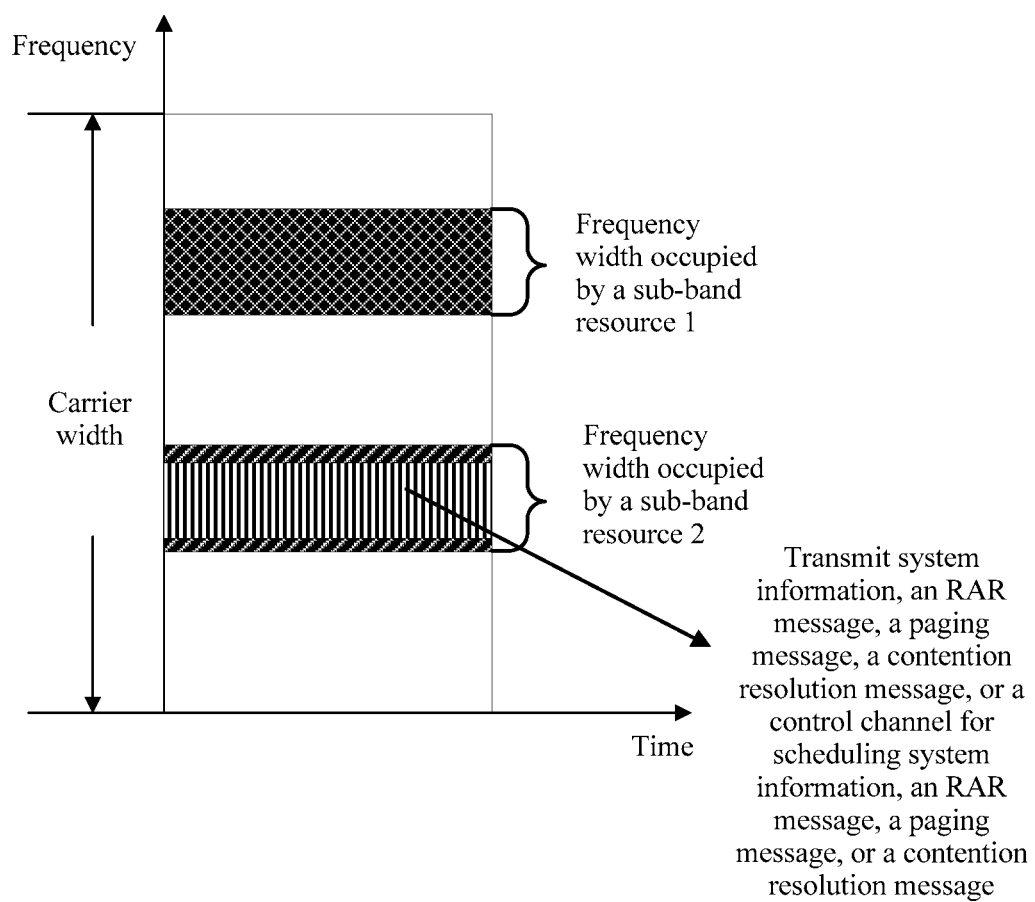
FIG. 4 is a schematic diagram of message sending on a carrier including multiple sub-bands.

In a current wireless communications system, system information, an RAR message, a paging message, and a contention resolution message are transmitted only on a primary component carrier. A control channel for scheduling system information, an RAR message, a paging message, or a contention resolution message is transmitted only on a primary component carrier. Alternatively, system information, an RAR message, a paging message, and a contention resolution message are transmitted on only one common sub-band resource of a carrier. Alternatively, a control channel for scheduling system information, an RAR message, a paging message, or a contention resolution message is transmitted on only one common sub-band resource of a carrier. As shown in FIG. 3 and FIG. 4, FIG. 3 is a schematic diagram of message sending in a carrier aggregation scenario, and FIG. 4 is a schematic diagram of message sending on a carrier including multiple sub-bands.

It can be learned from FIG. 3 and FIG. 4 that system information, an RAR message, a paging message, and a contention resolution message (or control channel for scheduling system information, an RAR message, a paging message, or a contention resolution message) are transmitted only on a primary component carrier, or system information, an RAR message, a paging message, and a contention resolution message (or control channel for scheduling system information, an RAR message, a paging message, or a contention resolution message) are transmitted on only one common sub-band resource of a carrier. A capacity for transmitting the system information, the RAR message, the paging message, and the contention resolution message (or the control channel for scheduling system information, an RAR message, a paging message, or a contention resolution message) on the primary component carrier or the common sub-band resource is extremely limited. For example, the control channel for scheduling system information, an RAR message, a paging message, or a contention resolution message is limited by a quantity of control channel elements in common search space (CSS) or enhanced common search space (eCSS), and consequently, a quantity of control channels for scheduling system information, an RAR message, a paging message, or a contention resolution message is limited. Similarly, transmission of the system information, the RAR message, the paging message, and the contention resolution message is limited by a size of the primary component carrier or a size of the common sub-band resource, and consequently, system information, an RAR message, a paging message, and a contention resolution message that can be supported are limited. In particular, in consideration of transmission of system information, an RAR message, a paging message, and a contention resolution message to UE with a single receive antenna, an amount of system information that can be transmitted on a limited resource, or a quantity of RAR messages, paging messages, or contention resolution messages that can be transmitted on a limited resource is further limited.

Figure 5:
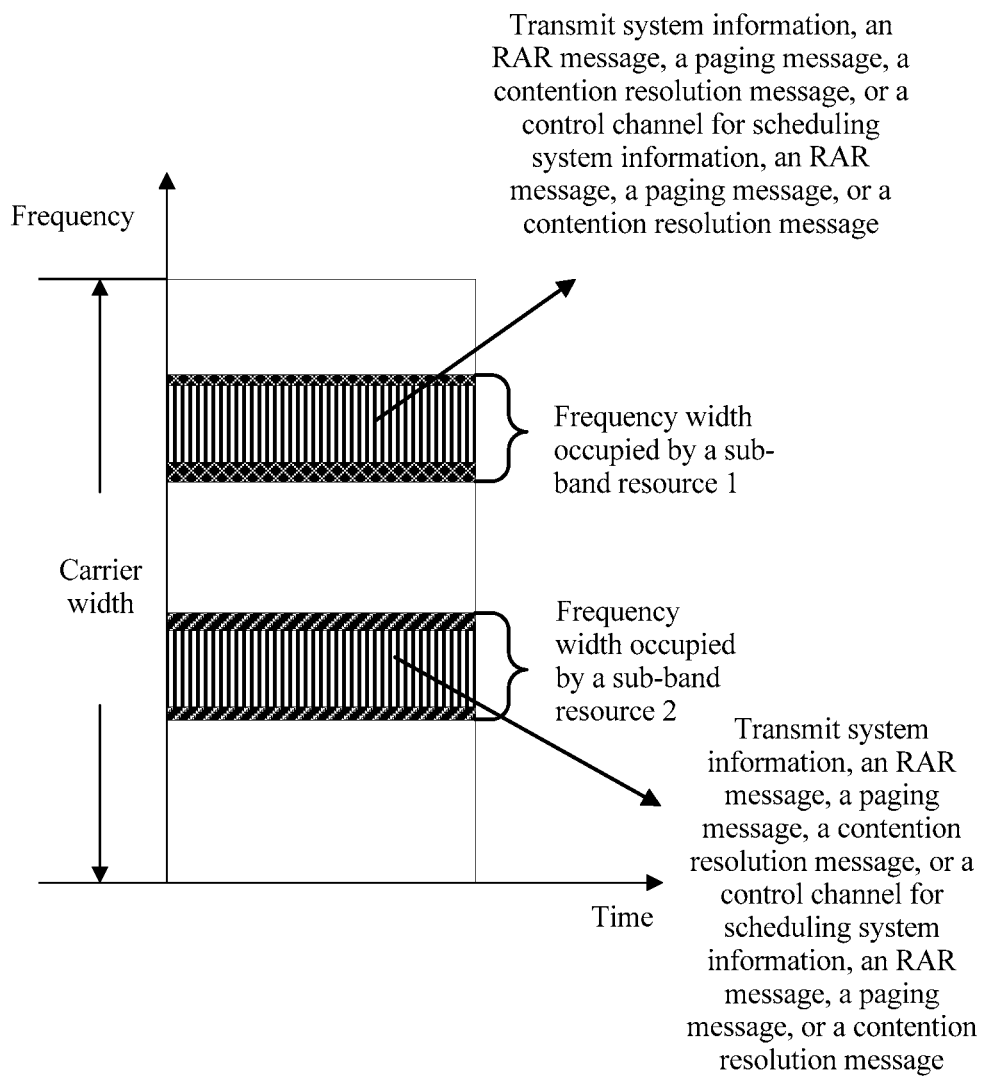
FIG. 5 is a schematic diagram of sending information on multiple sub-bands on a carrier including multiple sub-bands.

To resolve a problem of a limited capacity in sending information on the carrier including multiple sub-bands shown in FIG. 4, currently, there is a solution of transmitting system information, an RAR message, a paging message, and a contention resolution message (or a control channel for scheduling system information, an RAR message, a paging message, or a contention resolution message) on multiple sub-band resources on a carrier. As shown in FIG. 5, FIG. 5 is a schematic diagram of sending information on multiple sub-bands on a carrier including multiple sub-bands.

In a solution shown in FIG. 5, an RAR message, a paging message, and a contention resolution message are messages for a group of UEs. In the solution shown in FIG. 5, transmitting the RAR message, the paging message, and the contention resolution message (or a control channel for scheduling the RAR message, the paging message, or the contention resolution message) on multiple sub-bands may increase a paging capacity or affect random access of more UEs.

In the solution shown in FIG. 5, the problem of a limited capacity in sending information on a carrier can be resolved. However, because system information (or a control channel for scheduling system information) is a common message for all UEs, if the system information (or the control channel for scheduling the system information) is transmitted on all sub-band resources, much repeated system information (or a control channel for scheduling system information) is transmitted, and consequently, a system resource is wasted and power consumption of a base station is wasted.

Optionally, UE of low complexity or low costs has limited receiving bandwidth or sending bandwidth. Therefore, if unicast information (unicast data and/or control information for scheduling unicast data) of the UE of low complexity or low costs is not transmitted on a same sub-band resource as an RAR message, a paging message, or a contention resolution message (or a control channel for scheduling an RAR message, a paging message, or a contention resolution message) of the UE of low complexity or low costs, the UE has to perform handover between a sub-band resource for receiving the unicast information and a sub-band resource for receiving the RAR message, the paging message, and the contention resolution message (or the control channel for scheduling the RAR message, the paging message, or the contention resolution message). Consequently, power consumption of the UE is wasted and standard complexity is increased.

In conclusion, in the solution shown in FIG. 5, system information is transmitted in each sub-band resource, and consequently, much repeated system information is transmitted, a system resource is wasted, and power consumption of a base station is wasted. In addition, if unicast information (unicast data and/or control information for scheduling unicast data) of UE of low complexity or low costs is not transmitted on a same sub-band resource as an RAR message, a paging message, or a contention resolution message (or a control channel for scheduling an RAR message, a paging message, or a contention resolution message) of the UE of low complexity or low costs, the UE has to perform handover between a sub-band resource for receiving the unicast information (the unicast data and/or the control information for scheduling unicast data) and a sub-band resource for receiving the RAR message, the paging message, or the contention resolution message (or the control channel for scheduling the RAR message, the paging message, or the contention resolution message). Consequently, power consumption of the UE is wasted and standard complexity is increased.

In conclusion, in a multi-sub-band or carrier aggregation scenario, transmission of information such as system information, an RAR message, a paging message, and a contention resolution message has a specific disadvantage. Embodiments of the present disclosure provide an information transmission method and an apparatus, to resolve the foregoing disadvantage.

The information transmission method and the apparatus provided in the embodiments of the present disclosure are applicable to any communications system. If an entity in the communications system can send one or more of system information, an RAR message, a paging message, or a contention resolution message, there is another entity in the communications system that can receive one or more of system information, an RAR message, a paging message, or a contention resolution message, for example, a Long Term Evolution (LTE) system or a Long Term Evolution Advanced (LTE-A) system.

Figure 6:
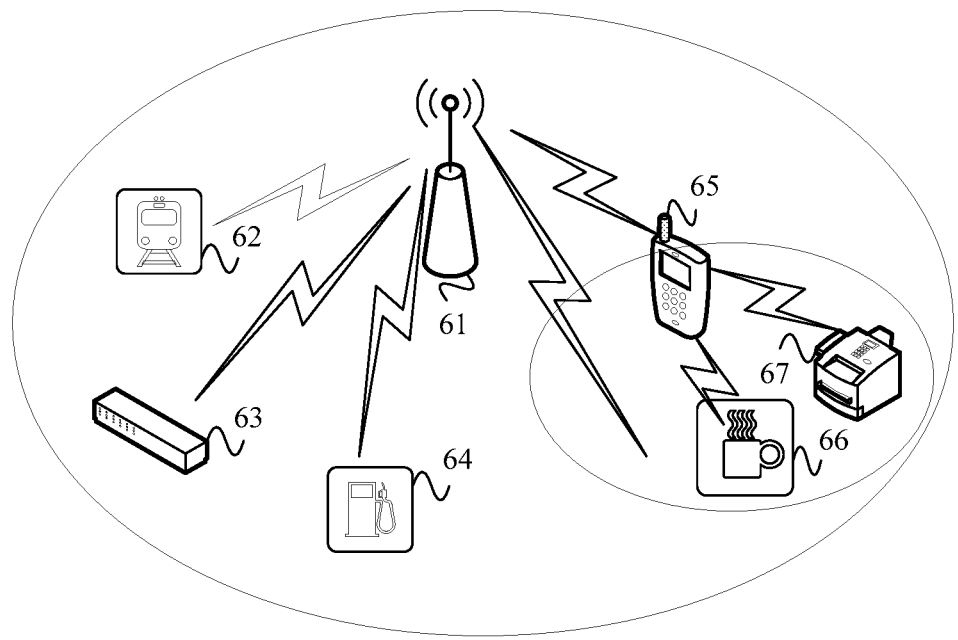
FIG. 6 is a schematic diagram of an application scenario of an information transmission method and an apparatus according to embodiments of the present disclosure.

FIG. 6 is a schematic diagram of an application scenario of an information transmission method and an apparatus according to embodiments of the present disclosure. As shown in FIG. 6, totally seven network entities: a base station 61, and UE 62 to UE 67 constitute a communications system. In the communications system, the base station 61 sends one or more of system information, an RAR message, a paging message, or a contention resolution message to one or more of the UE 62 to the UE 67. The UE 65 to the UE 67 also constitute a communications system, and the UE 65 may send one or more of system information, an RAR message, a paging message, or a contention resolution message to one or both of the UE 66 or the UE 67. In a communications system including the UE 64 to the UE 66, the UE 65 is equivalent to a base station in the communications system including the UE 65 to the UE 67.

Figure 7:
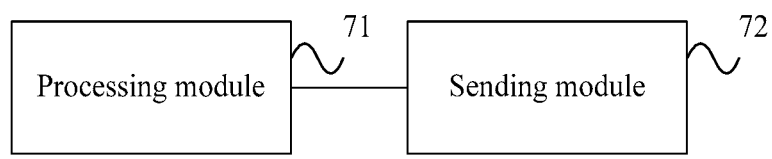
FIG. 7 is a schematic structural diagram of Embodiment 1 of a base station according to an embodiment of the present disclosure.

FIG. 7 is a schematic structural diagram of Embodiment 1 of a base station according to an embodiment of the present disclosure. As shown in FIG. 7, the base station in this embodiment includes:

a processing module 71, configured to determine a first transmission resource; and a sending module 72, configured to send first information by using the first transmission resource, where the first information includes at least one of system information or control information for scheduling system information.

The processing module 71 is further configured to determine at least one second transmission resource.

The sending module 72 is further configured to send second information to UE by using the second transmission resource. The second information includes at least one of: a paging message, a random access response message, a contention resolution message, control information for scheduling a paging message, control information for scheduling a random access response message, or control information for scheduling a contention resolution message.

Considering that the system information and/or the control information for scheduling system information are/is sent by the base station to all UEs within a coverage area at the same time, system information received by all the UEs within the coverage area of the base station is the same. The paging message, the RAR message, or the contention resolution message (the control information for scheduling a paging message, the control information for scheduling a random access response message, or the control information for scheduling a contention resolution message) may be sent by the base station to a group of UEs, and is not sent to all the UEs within the coverage area of the base station at the same time. In consideration of coverage enhancement, the UEs within the coverage area of the base station may be classified into multiple groups, and the base station repeatedly sends the paging message, the RAR message, or the contention resolution message to each group of UEs for a different quantity of times. Sending the paging message, the RAR message, or the contention resolution message (the control information for scheduling a paging message, the control information for scheduling a random access response message, or the control information for scheduling a contention resolution message) on multiple sub-band resources may increase a quantity of UEs that can be supported by the paging message, the RAR message, or the contention resolution message.

The base station provided in this embodiment separates a transmission resource for sending the system information from a transmission resource for sending the paging message, the RAR message, or the contention resolution message (the control information for scheduling a paging message, the control information for scheduling a random access response message, or the control information for scheduling a contention resolution message), sends the system information by using some transmission resources, and sends the paging message, the RAR message, or the contention resolution message (the control information for scheduling a paging message, the control information for scheduling a random access response message, or the control information for scheduling a contention resolution message) by using other transmission resources. Transmission of the paging message, the RAR message, or the contention resolution message is limited by a sub-band resource size, and the paging message, the RAR message, or the contention resolution message supports a limited quantity of UEs on a group of transmission resources. Therefore, the base station may divide transmission resources for sending the paging message, the RAR message, or the contention resolution message into multiple groups, and sends the paging message, the RAR message, or the contention resolution message to a group of UEs on each group of transmission resources. In this way, a problem of a limited capacity of a transmission resource for sending the paging message, the RAR message, or the contention resolution message is resolved, and no redundant system information is sent.

Specifically, the base station provided in this embodiment includes the processing module 71 and the sending module 72. The processing module 71 is configured to determine the first transmission resource and the at least one second transmission resource. The sending module 72 is configured to: send the first information by using the first transmission resource, where the first information includes at least one of system information or control information for scheduling system information; and send the second information to the UE by using the second transmission resource, where the second information includes at least one of: a paging message, a random access response message, a contention resolution message, control information for scheduling a paging message, control information for scheduling a random access response message, or control information for scheduling a contention resolution message.

The first transmission resource and the second transmission resource indicate transmission resources used for transmitting the first information and the second information. The first transmission resource and the second transmission resource may be any one of a frequency resource, a time resource, a time-frequency resource, or a code word resource. In the following embodiments of the present disclosure, only the frequency resource is used as an example for description, that is, the first transmission resource is a first frequency resource and the second transmission resource is a second frequency resource in an example for description.

The first information includes one or more of the system information or the control information for scheduling the system information. The system information includes related parameter information of a cell. For example, the system information includes an SIB and/or an MIB. The SIB may be in multiple SIB types. The system information may be information scrambled by an SI-RNTI. For a specific category of UE or multiple categories of UEs, a new SIB and/or MIB may be defined for the specific category of UE or the multiple categories of UEs. The control information indicates one or more of a resource occupied for information transmission, a modulation and coding scheme, or a frequency hopping indication that is scheduled by the control information. The control information may be carried on a physical downlink control channel (PDCCH), an enhanced physical downlink control channel (EPDCCH), or another type of control channel. Alternatively, the control information may be carried on another physical channel, logical channel, or transmission channel.

The second information includes one or more of paging information, a random access response, control information for scheduling paging information, control information for scheduling a random access response, contention resolution message, or control information for scheduling a contention resolution message. A paging message sent by the base station may carry paging information for multiple UEs. A random access response message sent by the base station may carry random access response information for multiple UEs. Content and transmission of the control information are similar to those of the first information. Details are not described herein.

The processing module 71 is specifically configured to determine the first transmission resource according to a system parameter. The system parameter includes one or more of a system radio frame number, a subframe number, system bandwidth, configuration information of the first transmission resource, a frequency hopping pattern, a transmission period of the system information, transmission time resource information of the system information, or a resource scheduling granularity.

Alternatively, the processing module 71 may determine the first transmission resource in a preset or default manner. The first transmission resource herein is a first transmission resource preset in a system or a default first transmission resource in a system.

The processing module 71 is specifically configured to determine the second transmission resource in a preset or default manner. The second transmission resource may be a second transmission resource preset in the system or a default second transmission resource in the system.

Alternatively, the processing module 71 determines the at least one second transmission resource according to one or more of the system parameter, configuration information of the second transmission resource, a UE specific parameter, or a UE group specific parameter. For example, the system parameter may be one or more of a system radio frame number, a subframe number, system bandwidth, a quantity of first transmission resources, a frequency hopping pattern, a transmission period of the system information, transmission time resource information of the system information, or the like. The UE specific parameter may be UE identification information or other specific information of the UE. For example, the UE identification information may be an international mobile subscriber identity (IMSI), an international mobile equipment identity (IMEI), a temporary mobile subscriber identity (TMSI), or a radio network temporary identifier (RNTI). The other specific information of the UE may be one or more of a preamble sequence selected by the UE or a preamble sequence index selected by the UE, access moment information selected by the UE, access transmission resource information selected by the UE, or specific frequency hopping information of the UE. The UE group specific parameter may be one or more of an RA-RNTI, specific time resource information of a UE group, specific transmission resource information of a UE group, or specific frequency hopping information of a UE group. The base station may determine the second transmission resource for specific UE (or a specific UE group) according to a correspondence between the UE specific parameter (or the UE group specific parameter) and the second transmission resource. The correspondence herein may be embodied in one or more manners of a function, a table, predefining, or signaling configuration.

Alternatively, the processing module 71 determines the at least one second transmission resource according to transmission resource information of third information transmitted to the UE. The third information is one or more of unicast data transmitted to the UE, control information that is used for scheduling unicast data and that is transmitted to the UE, response feedback information transmitted to the UE, or UE pilot information transmitted to the UE, or the third information may be information scrambled by a C-RNTI, an SPS-RNTI, or a TPC-RNTI. For example, the base station determines to transmit the second information to the UE on a transmission resource for transmitting the third information to the UE. That is, the base station determines that the second transmission resource is a frequency resource for transmitting the third information to the UE.

Optionally, the processing module 71 determines the at least one second transmission resource according to the transmission resource information of the third information transmitted to the UE, and the processing module 71 is further configured to determine to transmit the second information to the UE on the transmission resource for transmitting the third information to the UE. It may be learned according to the foregoing description that the third information is one or more of unicast data transmitted to the UE, control information that is used for scheduling unicast data and that is transmitted to the UE, response feedback information transmitted to the UE, or UE pilot information transmitted to the UE. That is, the third information is data transmitted in normal communication between the UE and the base station. That is, the base station may send the second information to the UE on a transmission resource used for normal communication between the UE and the base station.

It should be noted that the first frequency resource and the second frequency resource are frequency resources that are different in frequency. With reference to the carrier aggregation scenario shown in FIG. 3, the first frequency resource is a first carrier, the second frequency resource is a second carrier, and the first carrier and the second carrier are carriers that are different in frequency. With reference to the carrier scenario including multiple sub-bands that is shown in FIG. 4, the first frequency resource is a first sub-band resource on a third carrier, the second frequency resource is a second sub-band resource on the third carrier, and the first sub-band resource and the second sub-band resource are sub-band resources that are different in frequency. There may be multiple second carriers or second sub-band resources. If multiple second frequency resources are configured for the base station on the third carrier, the base station may transmit the second information to a group of UEs on one second frequency resource, and transmit the second information to another group of UEs on another second frequency resource.

Specifically, for example, the first carrier and the second carrier are carries that occupy different frequency resources. Alternatively, the first frequency resource and the second frequency resource are sub-band resources that occupy different frequency resources. Alternatively, the first frequency resource and the second frequency resource occupy different time resources. If bandwidth of the first carrier is 20 MHz, and a center frequency is 900 MHz, a first carrier resource is from 890 MHz to 910 MHz. If bandwidth of the second carrier is 20 MHz, and a center frequency is 930 MHz, a second carrier resource is from 920 MHz to 940 MHz. For another example, if bandwidth of the third carrier is 20 MHz, and a center frequency is 2.0 GHz, a third carrier resource is from 1990 MHz to 2010 MHz. There are 100 PRBs (indexes are separately 0 to 99) on the third carrier. It is specified that the first sub-band resource on the third carrier occupies six PRB resources: #47, #48, #49, #50, #51, and #52, and it is specified that the second sub-band resource on the third carrier occupies six PRB resources: #57, #58, #59, #60, #61, and #62. For another example, the first frequency resource occupies six PRB resources: #47, #48, #49, #50, #51, and #52 in an even-number radio frame, and the second frequency resource occupies six PRB resources: #47, #48, #49, #50, #51, and #52 in an odd-number radio frame.

According to the base station provided in this embodiment, a first transmission resource and at least one second transmission resource are determined, first information is sent by using the first transmission resource, and second information is sent by using the second transmission resource. The first information includes at least one of system information or control information for scheduling system information, and the second information includes at least one of: a paging message, a random access response message, a contention resolution message, control information for scheduling a paging message, control information for scheduling a random access response message, or control information for scheduling a contention resolution message. Therefore, the base station can send the first information and the second information by using different transmission resources, so as to avoid repeated sending of the first information in addition to resolving a limited capacity of the second information, so that a system resource is saved.

Optionally, in the embodiment shown in FIG. 7, the sending module 72 is further configured to: carry the configuration information of the first transmission resource by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and send the configuration information of the first transmission resource to the UE; and/or carry first transmission resource information by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and send the first transmission resource information to the UE, where the first transmission resource information is used to indicate the first transmission resource.

It should be noted that the initial random access response and the RAR message are different random access response messages. The initial random access response is another random access response sent before the RAR message.

Optionally, in the embodiment shown in FIG. 7, the sending module 72 is further configured to: carry the configuration information of the second transmission resource by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and send the configuration information of the second transmission resource to the UE; and/or carry second transmission resource information by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and send the second transmission resource information to the UE, where the second transmission resource information is used to indicate the second transmission resource.

Optionally, in the embodiment shown in FIG. 7, the sending module 72 is further configured to send resource identification information to the UE. The resource identification information is used to notify the UE that the second transmission resource is the same as the first transmission resource or the second transmission resource is determined according to the second transmission resource information.

Optionally, in the embodiment shown in FIG. 7, the sending module 72 is specifically configured to: carry the resource identification information by using one or more of a synchronization channel, a physical broadcast channel, a physical control channel, a random access channel, preamble information, a master information block, a system information block, radio resource control common signaling, a random access response, a contention resolution message, radio resource control dedicated signaling, or media access control signaling, and send the resource identification information to the UE.

Optionally, in the embodiment shown in FIG. 7, if the base station does not update the first transmission resource information, the base station transmits the first information by using the first transmission resource that is determined previously. If the base station does not update the second transmission resource information, the base station transmits the second information by using the second transmission resource that is determined previously. If the base station does not carry the second transmission resource information or the resource identification information for the UE before transmitting the second information to the user equipment, the base station transmits the second information to the UE on the first transmission resource. After the base station carries the second transmission resource information or the resource identification information for the UE, the base station transmits the second information to the UE on a transmission resource indicated by the second transmission resource information or the resource identification information.

Figure 8:
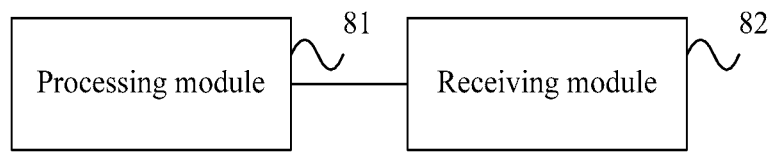
FIG. 8 is a schematic structural diagram of Embodiment 1 of user equipment according to an embodiment of the present disclosure.

FIG. 8 is a schematic structural diagram of Embodiment 1 of user equipment according to an embodiment of the present disclosure. As shown in FIG. 8, the user equipment in this embodiment includes:

a processing module 81, configured to determine a first transmission resource; and a receiving module 82, configured to receive, by using the first transmission resource, first information sent by a base station, where the first information includes at least one of system information or control information for scheduling system information.

The processing module 81 is further configured to determine a second transmission resource.

The receiving module 82 is further configured to receive, by using the second transmission resource, second information sent by the base station. The second information includes at least one of: a paging message, a random access response message, a contention resolution message, control information for scheduling a paging message, control information for scheduling a random access response message, or control information for scheduling a contention resolution message.

Specifically, the UE provided in this embodiment includes the processing module 81 and the receiving module 82. The processing module 81 is configured to determine the first transmission resource and the second transmission resource. The receiving module 82 is configured to: receive, by using the first transmission resource, the first information sent by the base station, where the first information includes at least one of system information or control information for scheduling system information; and receive, by using the second transmission resource, the second information sent by the base station, where the second information includes at least one of: a paging message, a random access response message, a contention resolution message, control information for scheduling a paging message, control information for scheduling a random access response message, or control information for scheduling a contention resolution message.

The first transmission resource and the second transmission resource indicate transmission resources used for transmitting the first information and the second information. The first transmission resource and the second transmission resource may be any one of a frequency resource, a time resource, a time-frequency resource, or a code word resource. In the following embodiments of the present disclosure, only the frequency resource is used as an example for description, that is, the first transmission resource is a first frequency resource and the second transmission resource is a second frequency resource in an example for description.

The first information and the second information in this embodiment are the same as the first information and the second information in the embodiment shown in FIG. 7, and details are not described herein.

The processing module 81 is specifically configured to determine the first transmission resource according to a system parameter, where the system parameter includes one or more of a system radio frame number, a subframe number, system bandwidth, configuration information of the first transmission resource, a frequency hopping pattern, a transmission period of the system information, transmission time resource information of the system information, or a resource scheduling granularity.

Alternatively, the processing module 81 may determine the first transmission resource in a preset or default manner. The first transmission resource herein is a first transmission resource preset in a system or a default first transmission resource in a system.

The processing module 81 is specifically configured to determine the second transmission resource in a preset or default manner. The second transmission resource may be a second transmission resource preset in the system or a default second transmission resource in the system.

Alternatively, the processing module 81 determines the second transmission resource according to one or more of the system parameter, configuration information of the second transmission resource, a UE specific parameter, or a UE group specific parameter. For example, the system parameter may be one or more of a system radio frame number, a subframe number, system bandwidth, a quantity of first transmission resources, a frequency hopping pattern, a transmission period of the system information, transmission time resource information of the system information, or the like. The UE specific parameter may be UE identification information or other specific information of the UE. For example, the UE identification information may be an IMSI, an IMEI, a TMSI, or an RNTI. The other specific information of the UE may be one or more of a preamble sequence selected by the UE or a preamble sequence index selected by the UE, access moment information selected by the UE, access transmission resource information selected by the UE, or specific frequency hopping information of the UE. The UE group specific parameter may be one or more of an RA-RNTI, specific time resource information of a UE group, specific transmission resource information of a UE group, or specific frequency hopping information of a UE group. The base station may determine the second transmission resource for specific UE (or a specific UE group) according to a correspondence between the UE specific parameter (or the UE group specific parameter) and the second transmission resource. The correspondence herein may be embodied in one or more manners of a function, a table, predefining, or signaling configuration.

Alternatively, the processing module 81 determines the second transmission resource according to transmission resource information of third information transmitted to the UE. The third information is one or more of unicast data transmitted to the UE, control information that is used for scheduling unicast data and that is transmitted to the UE, response feedback information transmitted to the UE, or UE pilot information transmitted to the UE. For example, the UE determines to transmit the second information on a transmission resource for transmitting the third information. That is, the UE determines that the second transmission resource is a frequency resource for transmitting the third information.

Optionally, the processing module 81 determines the second transmission resource according to the transmission resource information of the third information transmitted to the UE, and the processing module is further configured to determine to receive the second information on the transmission resource for transmitting the third information to the UE. It may be learned according to the foregoing description that the third information is one or more of unicast data transmitted to the UE, control information that is used for scheduling unicast data and that is transmitted to the UE, response feedback information transmitted to the UE, or UE pilot information transmitted to the UE. The UE may receive, on a transmission resource used for receiving the third information, the second information sent by the base station.

It should be noted that the first frequency resource and the second frequency resource are resources that are different in frequency. With reference to the carrier aggregation scenario shown in FIG. 3, the first frequency resource is a first carrier, the second frequency resource is a second carrier, and the first carrier and the second carrier are carriers that are different in frequency. With reference to the carrier scenario including multiple sub-bands that is shown in FIG. 4, the first frequency resource is a first sub-band resource on a third carrier, the second frequency resource is a second sub-band resource on the third carrier, and the first sub-band resource and the second sub-band resource are sub-band resources that are different in frequency. The UE may know system bandwidth of the third carrier, so as to determine the first sub-band resource and the second sub-band resource on the system bandwidth. The UE may not know the third carrier (or does not known the system bandwidth of the third carrier), and determine the first sub-band resource and the second sub-band resource according to indication information. There may be multiple second carriers or second sub-band resources. There are at least two different UEs in the system, and the two UEs receive respective second information by using different second frequency resources. Alternatively, there is at least one UE, a first frequency resource for receiving the first information by the UE and a second frequency resource for receiving the second information by the UE are different in frequency resources.

According to the user equipment provided in this embodiment, a first transmission resource and at least one second transmission resource are determined, first information is received by using the first transmission resource, and second information is received by using the second transmission resource. The first information includes at least one of system information or control information for scheduling system information, and the second information includes at least one of: a paging message, a random access response message, a contention resolution message, control information for scheduling a paging message, control information for scheduling a random access response message, or control information for scheduling a contention resolution message. In this way, the UE receives the first information and the second information by using different transmission resources, so as to avoid repeated sending of the system information in addition to resolving a limited capacity of the second information, so that a system resource is saved.

Optionally, in the embodiment shown in FIG. 8, the receiving module 82 is further configured to: receive the configuration information that is of the first transmission resource and that is carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling; and/or receive first transmission resource information carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, where the first transmission resource information is used to indicate the first transmission resource.

It should be noted that the initial random access response and the RAR message are different random access response messages. The initial random access response is another random access response sent before the RAR message.

Optionally, in the embodiment shown in FIG. 8, the receiving module 82 is further configured to: receive the configuration information that is of the second transmission resource and that is carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling; and/or receive second transmission resource information carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, where the second transmission resource information is used to indicate the second transmission resource.

Optionally, in the embodiment shown in FIG. 8, the receiving module 82 is further configured to receive resource identification information sent by the base station. The resource identification information is used to notify the UE that the second transmission resource is the same as the first transmission resource or the second transmission resource is determined according to the second transmission resource information.

Optionally, in the embodiment shown in FIG. 8, the receiving module 82 is specifically configured to receive the resource identification information carried by the base station by using one or more of a synchronization channel, a physical broadcast channel, a physical control channel, a random access channel, preamble information, a master information block, a system information block, radio resource control common signaling, a random access response, a contention resolution message, radio resource control dedicated signaling, or media access control signaling.

Optionally, in the embodiment shown in FIG. 8, if the UE does not update the first transmission resource information, the user equipment transmits the first information by using the first transmission resource that is determined previously. If the UE does not update the second transmission resource information, the UE transmits the second information by using the second transmission resource that is determined previously. If the UE does not obtain the second transmission resource information or the resource identification information before receiving the second information, the user equipment receives the second information on the first transmission resource. After the UE obtains the second transmission resource information or the resource identification information, the UE receives the second information on a transmission resource indicated by the second transmission resource information or the resource identification information.

Figure 9:
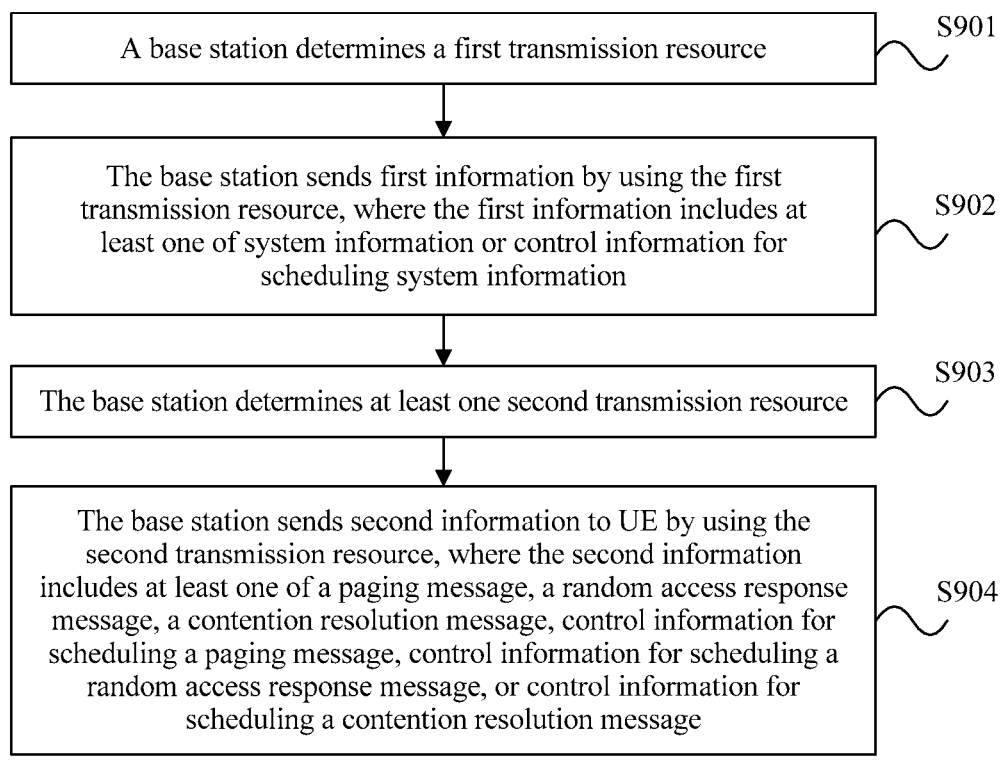
FIG. 9 is a flowchart of Embodiment 1 of an information transmission method according to an embodiment of the present disclosure.

FIG. 9 is a flowchart of Embodiment 1 of an information transmission method according to an embodiment of the present disclosure. As shown in FIG. 9, the method in this embodiment includes the following steps.

Step 901: A base station determines a first transmission resource.

Step 902: The base station sends first information by using the first transmission resource, where the first information includes at least one of system information or control information for scheduling system information.

Step 903: The base station determines at least one second transmission resource.

Step 904: The base station sends second information to UE by using the second transmission resource, where the second information includes at least one of: a paging message, a random access response message, a contention resolution message, control information for scheduling a paging message, control information for scheduling a random access response message, or control information for scheduling a contention resolution message.

It should be noted that step 901 and step 903 are not performed in sequence, and usually, step 901 and step 903 are performed simultaneously. Step 902 and step 904 are not performed in sequence.

The information transmission method in this embodiment is used to implement processing of the base station in the embodiment shown in FIG. 7, and implementation principles and technical effects of the information transmission method are similar to implementation principles and technical effects of the base station, and details are not described herein.

Optionally, in the embodiment shown in FIG. 9, the first transmission resource includes a first frequency resource, and the second transmission resource includes a second frequency resource.

Optionally, in the embodiment shown in FIG. 9, the first frequency resource and the second frequency resource are frequency resources that are different in frequency. For example, the first frequency resource is a first carrier, the second frequency resource is a second carrier, and the first carrier and the second carrier are carriers that are different in frequency; or the first frequency resource is a first sub-band resource on a third carrier, the second frequency resource is a second sub-band resource on the third carrier, and the first sub-band resource and the second sub-band resource are sub-band resources that are different in frequency.

Optionally, in the embodiment shown in FIG. 9, that a base station determines a first transmission resource includes: the base station determines the first transmission resource according to a system parameter, where the system parameter includes one or more of a system radio frame number, a subframe number, system bandwidth, configuration information of the first transmission resource, a frequency hopping pattern, a transmission period of the system information, transmission time resource information of the system information, or a resource scheduling granularity; or the base station determines the first transmission resource according to preset information.

Figure 10A:
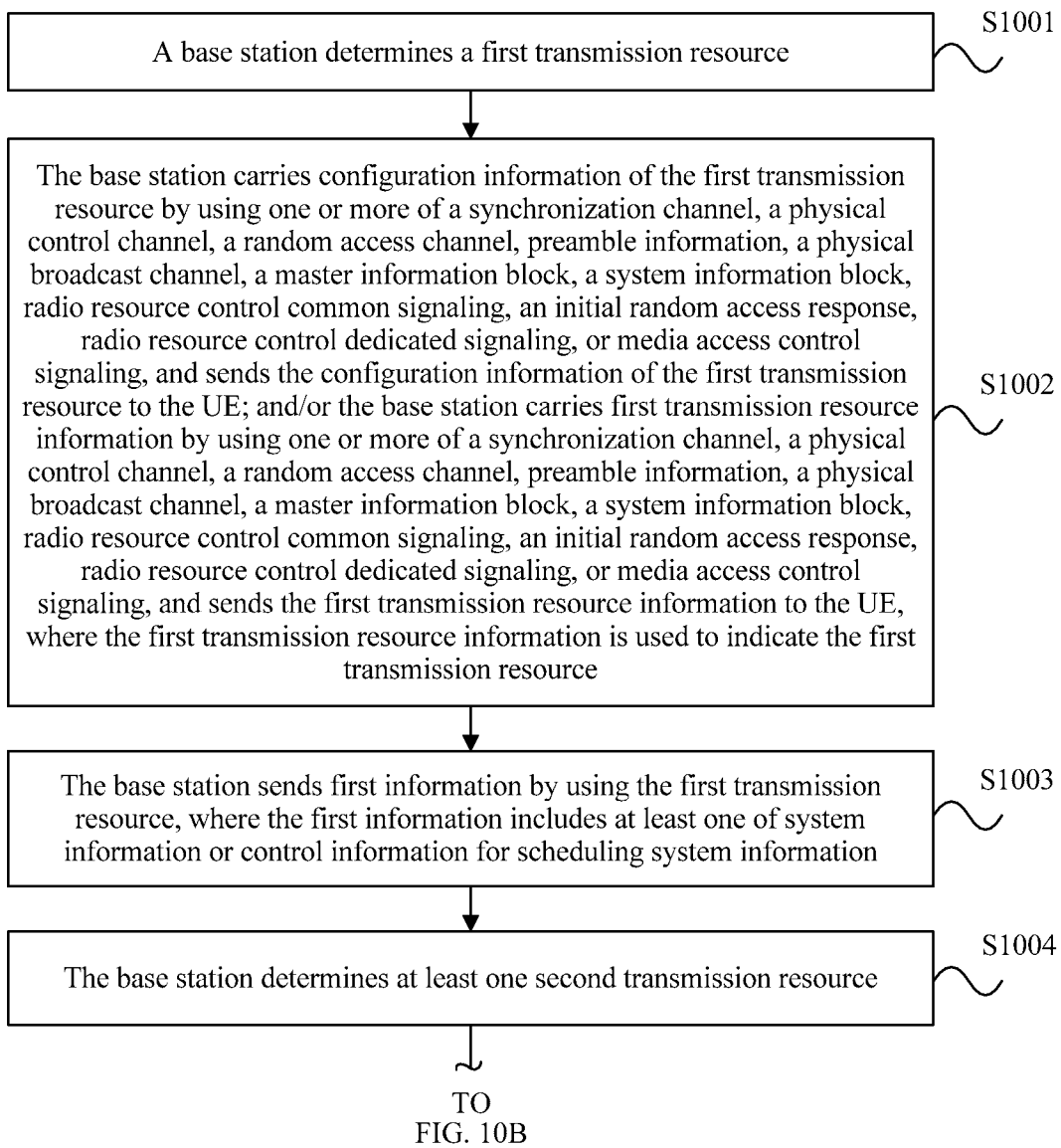

FIG. 10A and FIG. 10B are a flowchart of Embodiment 2 of an information transmission method according to an embodiment of the present disclosure. As shown in FIG. 10A and FIG. 10B, the method in this embodiment includes the following steps.

Step 1001: A base station determines a first transmission resource.

Step 1002: The base station carries configuration information of the first transmission resource by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and sends the configuration information of the first transmission resource to UE; and/or the base station carries first transmission resource information by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and sends the first transmission resource information to UE, where the first transmission resource information is used to indicate the first transmission resource.

Step 1003: The base station sends first information by using the first transmission resource, where the first information includes at least one of system information or control information for scheduling system information.

Step 1004: The base station determines at least one second transmission resource.

Step 1005: The base station carries configuration information of the second transmission resource by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and sends the configuration information of the second transmission resource to the UE; and/or the base station carries second transmission resource information by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and sends the second transmission resource information to the UE, where the second transmission resource information is used to indicate the second transmission resource.

Step 1006: The base station sends second information to the UE by using the second transmission resource, where the second information includes at least one of: a paging message, a random access response message, a contention resolution message, control information for scheduling a paging message, control information for scheduling a random access response message, or control information for scheduling a contention resolution message.

Optionally, in the embodiment shown in FIG. 9 or FIG. 10A and FIG. 10B, that the base station determines at least one second transmission resource includes: the base station determines the at least one second transmission resource according to preset information; or the base station determines the at least one second transmission resource according to one or more of the system parameter, configuration information of the second transmission resource, a UE specific parameter, or a UE group specific parameter; or the base station determines the at least one second transmission resource according to transmission resource information of third information transmitted to the UE, where the third information is one or more of unicast data transmitted to the UE, control information that is used for scheduling unicast data and that is transmitted to the UE, response feedback information transmitted to the UE, or UE pilot information transmitted to the UE.

Optionally, in the embodiment shown in FIG. 9 or FIG. 10A and FIG. 10B, that the base station determines the at least one second transmission resource according to transmission resource information of third information transmitted to the UE further includes: the base station determines to transmit the second information to the UE on a transmission resource for transmitting the third information to the UE.

Optionally, in the embodiment shown in FIG. 9 or FIG. 10A and FIG. 10B, the base station carries the second transmission resource information by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, and sends the second transmission resource information to the UE.

Optionally, in the embodiment shown in FIG. 9 or FIG. 10A and FIG. 10B, the method further includes: the base station sends resource identification information to the UE, where the resource identification information is used to notify the UE that the second transmission resource is the same as the first transmission resource or the second transmission resource is determined according to the second frequency resource information.

Optionally, in the embodiment shown in FIG. 9 or FIG. 10A and FIG. 10B, that the base station sends resource identification information to the UE includes: the base station carries the resource identification information by using one or more of a synchronization channel, a physical broadcast channel, a physical control channel, a random access channel, preamble information, a master information block, a system information block, radio resource control common signaling, a random access response, a contention resolution message, radio resource control dedicated signaling, or media access control signaling, and sends the resource identification information to the UE.

Figure 11:
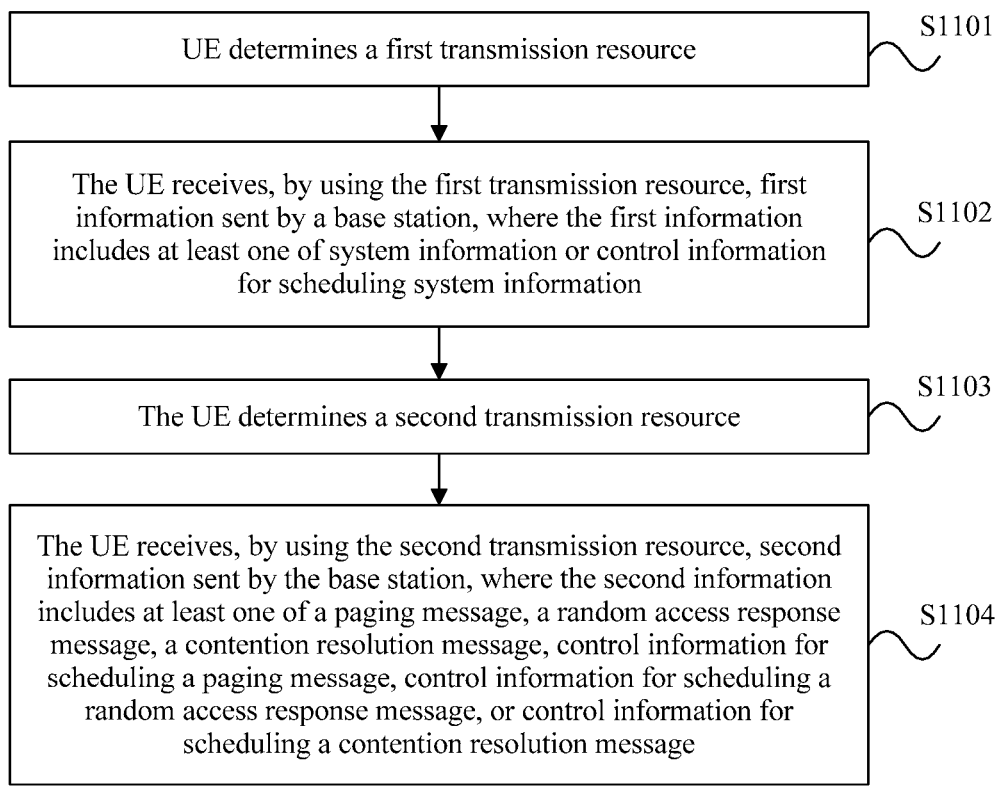
FIG. 11 is a flowchart of Embodiment 3 of an information transmission method according to an embodiment of the present disclosure.

FIG. 11 is a flowchart of Embodiment 3 of an information transmission method according to an embodiment of the present disclosure. As shown in FIG. 11, the method in this embodiment includes the following steps.

Step 1101: UE determines a first transmission resource.

Step 1102: The UE receives, by using the first transmission resource, first information sent by a base station, where the first information includes at least one of system information or control information for scheduling system information.

Step 1103: The UE determines a second transmission resource.

Step 1104: The UE receives, by using the second transmission resource, second information sent by the base station, where the second information includes at least one of: a paging message, a random access response message, a contention resolution message, control information for scheduling a paging message, control information for scheduling a random access response message, or control information for scheduling a contention resolution message.

It should be noted that step 1101 and step 1103 are not performed in sequence, and usually, step 1101 and step 1103 are performed simultaneously. Step 1102 and step 1104 are not performed in sequence.

The information transmission method in this embodiment is used to implement processing of the UE in the embodiment shown in FIG. 8, and implementation principles and technical effects of the information transmission method are similar to implementation principles and technical effects of the UE, and details are not described herein.

Optionally, in the embodiment shown in FIG. 11, the first transmission resource includes a first frequency resource, and the second transmission resource includes a second frequency resource.

Optionally, in the embodiment shown in FIG. 11, the first frequency resource and the second frequency resource are frequency resources that are different in frequency. For example, the first frequency resource is a first carrier, the second frequency resource is a second carrier, and the first carrier and the second carrier are carriers that are different in frequency; or the first frequency resource is a first sub-band resource on a third carrier, the second frequency resource is a second sub-band resource on the third carrier, and the first sub-band resource and the second sub-band resource are sub-band resources that are different in frequency.

Optionally, in the embodiment shown in FIG. 11, that UE determines a first transmission resource includes: the UE determines the first transmission resource according to a system parameter, where the system parameter includes one or more of a system radio frame number, a subframe number, system bandwidth, configuration information of the first transmission resource, a frequency hopping pattern, a transmission period of the system information, transmission time resource information of the system information, or a resource scheduling granularity; or the UE determines the first transmission resource according to preset information.

Figure 12A:
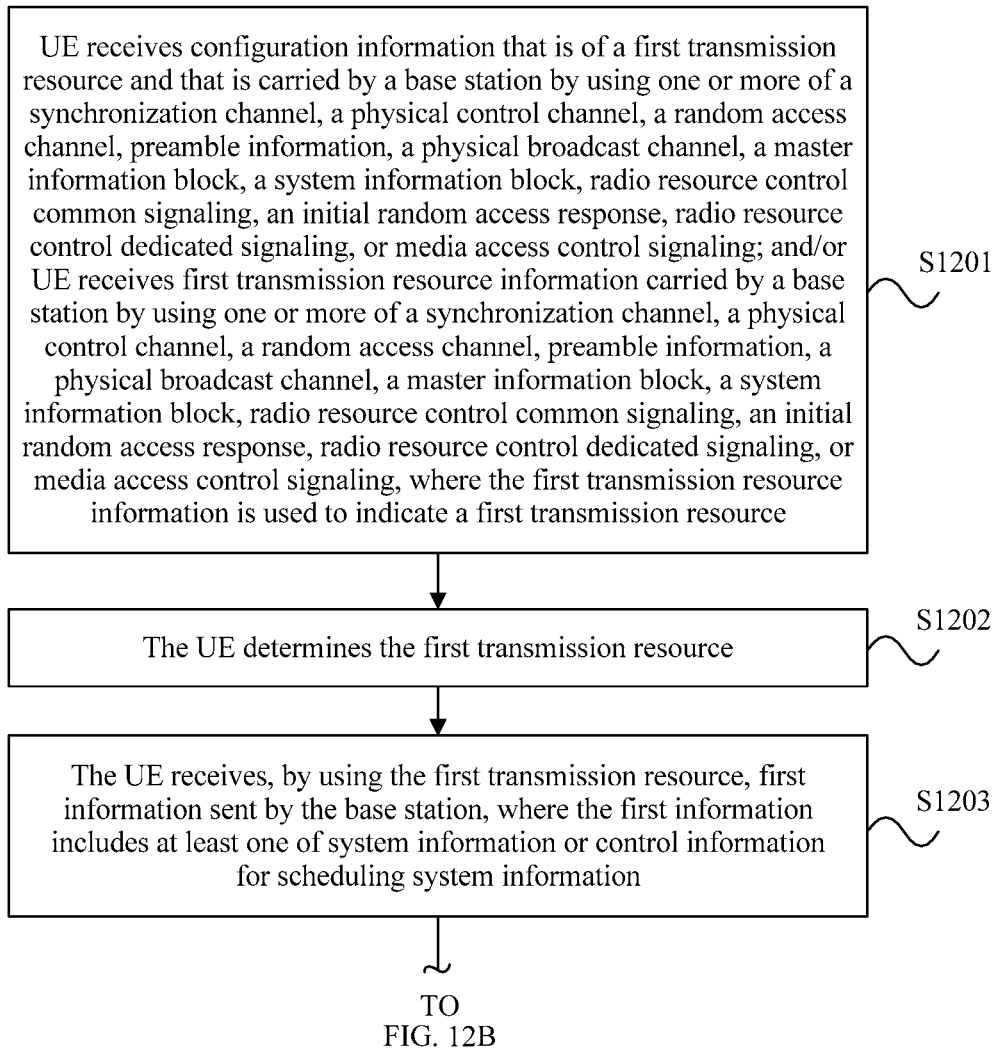
FIG. 12A and FIG. 12B are a flowchart of Embodiment 4 of an information transmission method according to an embodiment of the present disclosure.
Figure 12B:
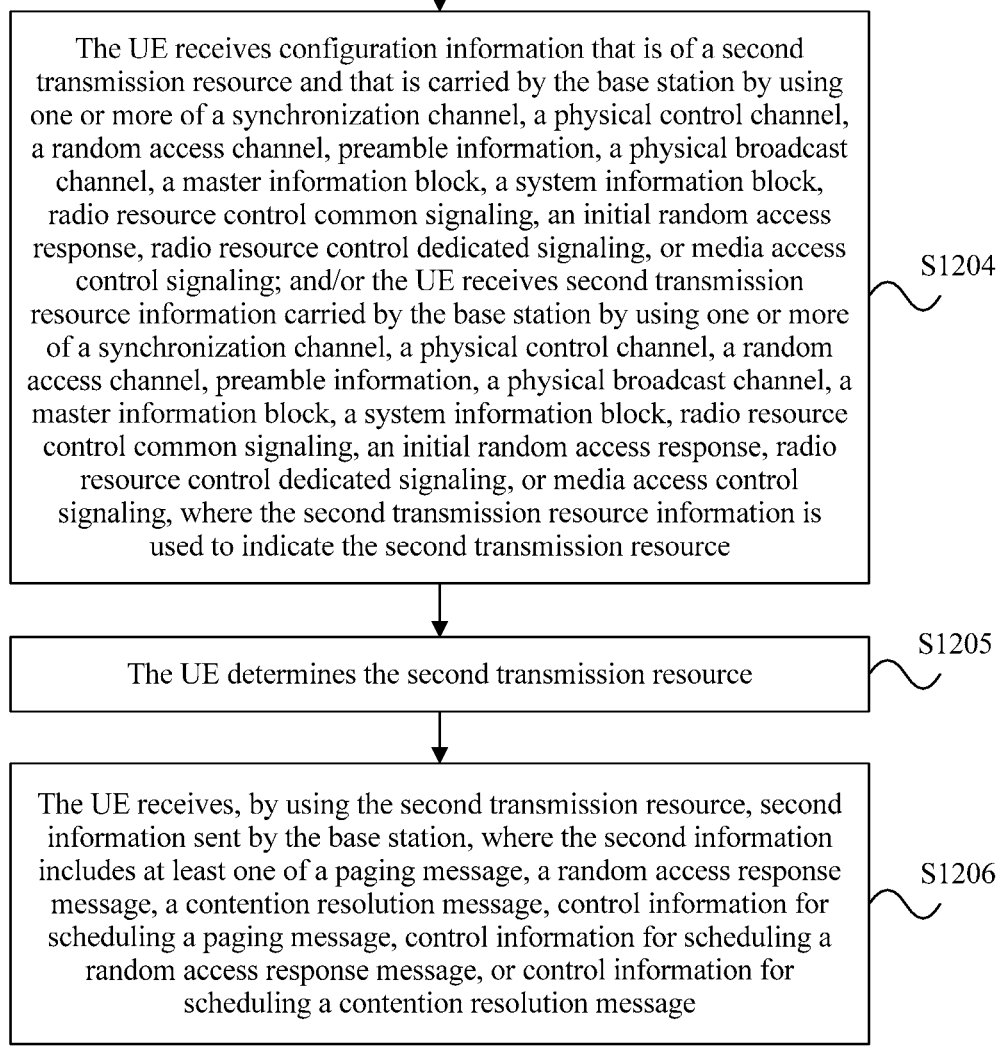

FIG. 12A and FIG. 12B are a flowchart of Embodiment 4 of an information transmission method according to an embodiment of the present disclosure. As shown in FIG. 12A and FIG. 12B, the method in this embodiment includes the following steps.

Step 1201: The UE receives configuration information that is of the first transmission resource and that is carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling; and/or UE receives first transmission resource information carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, where the first transmission resource information is used to indicate the first transmission resource.

Step 1202: The UE determines the first transmission resource.

Step 1203: The UE receives, by using the first transmission resource, first information sent by the base station, where the first information includes at least one of system information or control information for scheduling system information.

Step 1204: The UE receives configuration information that is of the second transmission resource and that is carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling; and/or the UE receives second transmission resource information carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling, where the second transmission resource information is used to indicate the second transmission resource.

Step 1205: The UE determines the second transmission resource.

Step 1206: The UE receives, by using the second transmission resource, second information sent by the base station, where the second information includes at least one of: a paging message, a random access response message, a contention resolution message, control information for scheduling a paging message, control information for scheduling a random access response message, or control information for scheduling a contention resolution message.

Optionally, in the embodiment shown in FIG. 11 or FIG. 12A and FIG. 12B, that the UE determines the second transmission resource includes: the UE determines the second transmission resource according to preset information; or the UE determines the second transmission resource according to one or more of the system parameter, configuration information of the second transmission resource, a UE specific parameter, or a UE group specific parameter; or the UE determines the second transmission resource according to transmission resource information of third information transmitted to the UE, where the third information is one or more of unicast data transmitted to the UE, control information that is used for scheduling unicast data and that is transmitted to the UE, response feedback information transmitted to the UE, or UE pilot information transmitted to the UE.

Optionally, in the embodiment shown in FIG. 11 or FIG. 12A and FIG. 12B, that the UE determines the second transmission resource according to transmission resource information of third information transmitted to the UE further includes: the UE determines to receive the second information on a transmission resource for transmitting the third information to the UE.

Optionally, in the embodiment shown in FIG. 11 or FIG. 12A and FIG. 12B, the UE receives the second transmission resource information carried by the base station by using one or more of a synchronization channel, a physical control channel, a random access channel, preamble information, a physical broadcast channel, a master information block, a system information block, radio resource control common signaling, an initial random access response, radio resource control dedicated signaling, or media access control signaling.

Optionally, in the embodiment shown in FIG. 11 or FIG. 12A and FIG. 12B, the method further includes: the UE receives resource identification information sent by the base station, where the resource identification information is used to notify the UE that the second transmission resource is the same as the first transmission resource or the second transmission resource is determined according to second frequency resource information.

Optionally, in the embodiment shown in FIG. 11 or FIG. 12A and FIG. 12B, that the UE receives resource identification information sent by the base station includes: the UE receives the resource identification information carried by the base station by using one or more of a synchronization channel, a physical broadcast channel, a physical control channel, a random access channel, preamble information, a master information block, a system information block, radio resource control common signaling, a random access response, a contention resolution message, radio resource control dedicated signaling, or media access control signaling.

Figure 13:
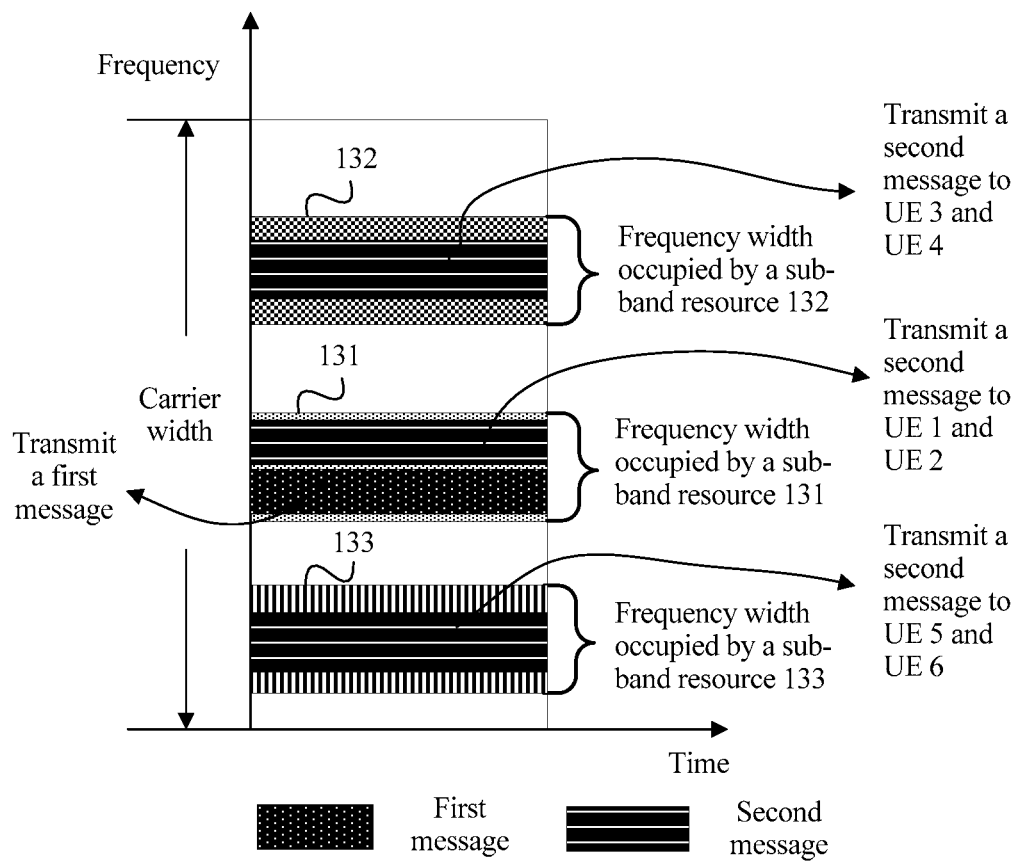
FIG. 13 is a schematic diagram of information transmission in an information transmission method according to an embodiment of the present disclosure.

FIG. 13 is a schematic diagram of information transmission in an information transmission method according to an embodiment of the present disclosure. In FIG. 13, a carrier including multiple sub-bands is used as an example for description. FIG. 13 shows three sub-bands of the carrier shown that are separately a sub-band resource 131, a sub-band resource 132, and a sub-band resource 133. The sub-band resource 131 is used as a first transmission resource, and any one of the resource resource 131, the sub-band resource 132, or the sub-band resource 133 may be used as a second transmission resource. It is assumed that a system includes six UEs that are separately from UE 1 to UE 6. A base station sends first information to all UEs within a coverage area by using the sub-band resource 131, and the UE 1 to the UE 6 receive the first information on the first sub-band resource 131. In addition, the base station sends second information to the UE 1 and the UE 2 by using the sub-band resource 131, and the UE 1 and the UE 2 receive the second information on the sub-band resource 131. The UE 1 and the UE 2 are a group of UE. The base station sends the second information to the UE 3 and the UE 4 by using the sub-band resource 132, and the UE 3 and the UE 4 receive the second information on the sub-band resource 132. The UE 3 and the UE 4 are a group of UE. The base station sends the second information to the UE 5 and the UE 6 by using the sub-band resource 133, and the UE 5 and the UE 6 receive the second information on the sub-band resource 133. The UE 5 and the UE 6 are a group of UE.

It may be learned from FIG. 13 that the first information is sent on only one sub-band resource 131 on a carrier, but the second information is transmitted to different groups of UE by using different sub-band resources, so that a transmission capacity of the second information is improved, and a resource used for transmitting the first information is reduced.

It should be noted that, in the foregoing embodiments of the present disclosure, the first transmission resource is a first frequency resource and the second transmission resource is a second frequency resource in an example for describing implementation of the present disclosure. However, an information transmission method and an apparatus provided in the present disclosure are not limited herein. Alternatively, the first transmission resource and the second transmission resource may be time resources, for example, the first transmission resource includes a first time resource, and the second transmission resource includes a second time resource. The first information is transmitted by using the first time resource, and the second information is transmitted by using the second time resource. The first time resource and the second time resource are totally orthogonal in terms of time, that is, the first time resource and the second time resource do not overlap in terms of time.

Similarly, in the information transmission method and the apparatus provided in the present disclosure, the first transmission resource and the second transmission resource may be time-frequency resources (time and frequency), for example, the first transmission resource includes a first time-frequency resource, and the second transmission resource includes a second time-frequency resource. The first information is transmitted by using the first time-frequency resource, and the second information is transmitted by using the second time-frequency resource. The first time-frequency resource and the second time-frequency resource are totally orthogonal in time and frequency, that is, the first time-frequency resource and the second time-frequency resource do not overlap in time and frequency.

Similarly, in the information transmission method and the apparatus provided in the present disclosure, the first transmission resource and the second transmission resource may be code word resources, for example, the first transmission resource includes a first code word resource, and the second transmission resource includes a second code word resource. The first information is transmitted by using the first code word resource, and the second information is transmitted by using the second code word resource. The first code word resource and the second code word resource are totally orthogonal in code word, that is, the first code word resource and the second code word resource are totally different code word sets.

According to this embodiment of the present disclosure, first information is transmitted on a common transmission resource, so that resource overheads occupied for transmitting the first information are reduced, resource usage is improved, and power consumption of a base station is reduced. Second information for different UEs may be transmitted on multiple transmission resources, so that a transmission capacity of the second information can be increased and a transmission delay of the second information can be reduced. Optionally, for UE, unicast information and second information of the UE are transmitted on one transmission resource, so that tuning between receiving unicast data by the UE and receiving the second information by the UE is avoided, power consumption of the UE is reduced, and implementation of the UE is simplified.

It should be noted that a sending module 72 in this embodiment of the present disclosure may be corresponding to a transmitter of a base station, or may be corresponding to a transceiver of a base station. A processing module 71 may be corresponding to a processor of the base station. The processor herein may be a central processing unit (CPU), or an application-specific integrated circuit (ASIC), or one or more integrated circuits implementing this embodiment of the present disclosure. The base station may further include a memory, and the memory is configured to store instruction code. The processor invokes the instruction code in the memory to control the processing module 71 and the sending module 72 in this embodiment of the present disclosure to perform the foregoing operations.

A receiving module 82 in this embodiment of the present disclosure may be corresponding to a receiver of user equipment, or may be corresponding to a transceiver of user equipment. The processing module 81 may be corresponding to a processor of the user equipment. The processor may be a CPU, or an ASIC, or one or more integrated circuits implementing this embodiment of the present disclosure. The user equipment may further include a memory, and the memory is configured to store instruction code. The processor invokes the instruction code in the memory to control the receiving module 82 and the processing module 81 in this embodiment of the present disclosure to perform the foregoing operations.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of the present disclosure shall be subject to the protection scope of the claims.

What is claimed is:

1. A base station, comprising:
a processor, configured to determine a first frequency resource of a carrier; and
a transceiver, configured to:
send first information through the first frequency resource of the carrier, wherein the first information comprises control information for scheduling system information; and
send second information to a user equipment (UE), wherein the second information comprises control information for scheduling at least one of a paging message or a random access response message;
wherein:
in response to the transceiver sending resource identification information before sending the second information, the second information is sent on a second frequency resource of the carrier indicated by the resource identification information, wherein the first frequency resource of the carrier and the second frequency resource of the carrier are different in frequency, and
in response to the transceiver not sending the resource identification information before sending the second information, the second information is sent on the first frequency resource of the carrier.

2. The base station according to claim 1, wherein the processor is configured to:
determine the first frequency resource of the carrier according to a system parameter, wherein the system parameter comprises at least one of the following: a system bandwidth or a resource scheduling granularity.

3. The base station according to claim 1, wherein a physical broadcast channel or a master information block carries first transmission resource information, and the first transmission resource information indicates the first frequency resource of the carrier.

4. The base station according to claim 1, wherein a system information block or radio resource control common signaling carries the resource identification information.

5. An apparatus, comprising:
a processor, configured to determine a first frequency resource of a carrier; and
a receiver, configured to:
receive first information through the first frequency resource of the carrier, wherein the first information comprises control information for scheduling system information; and
receive second information, wherein the second information comprises control information for scheduling at least one of a paging message or a random access response message,
wherein:
in response to resource identification information being received before receiving the second information, the second information is received on a second frequency resource of the carrier indicated by the resource identification information received before receiving the second information, wherein the first frequency resource of the carrier and the second frequency resource of the carrier are different in frequency, and
in response to the resource identification information not being received before receiving the second information, the second information is received on the first frequency resource of the carrier.

6. The apparatus according to claim 5, wherein the processor is configured to:
determine the first frequency resource of the carrier according to a system parameter, wherein the system parameter comprises at least one of the following: a system bandwidth or a resource scheduling granularity.

7. The apparatus according to claim 5, wherein a physical broadcast channel or a master information block carries first transmission resource information, and the first transmission resource information indicates the first frequency resource of the carrier.

8. The apparatus according to claim 5, wherein a system information block or radio resource control common signaling carries the resource identification information.

9. A communication method performed for a base station, the method comprising:
determining a first frequency resource of a carrier;
sending first information through the first frequency resource of the carrier, wherein the first information comprises control information for scheduling system information; and
sending second information to a user equipment (UE), wherein the second information comprises control information for scheduling at least one of a paging message or a random access response message;
wherein:
in response to resource identification information being sent before sending the second information, the second information is sent on a second frequency resource of the carrier indicated by the resource identification information, wherein the first frequency resource of the carrier and the second frequency resource of the carrier are different in frequency, and
in response to the resource identification information being not sent before sending the second information, the second information is sent on the first frequency resource of the carrier.

10. The method according to claim 9, wherein the determining the first transmission resource of the carrier comprises:
determining the first frequency resource of the carrier according to a system parameter, wherein the system parameter comprises at least one of the following: a system bandwidth or a resource scheduling granularity.

11. The method according to claim 9, wherein a physical broadcast channel or a master information block carries first transmission resource information, and the first transmission resource information indicates the first frequency resource of the carrier.

12. The method according to claim 9, wherein a system information block or radio resource control common signaling carries the resource identification information.

13. A communication method for a user equipment (UE), the method comprising:
determining a first frequency resource of a carrier;
receiving first information through the first frequency resource of the carrier, wherein the first information comprises control information for scheduling system information; and
receiving second information, wherein the second information comprises control information for scheduling at least one of a paging message or a random access response message,
wherein:
in response to resource identification information being received before receiving the second information, the second information is received on a second frequency resource of the carrier indicated by the resource identification information received before receiving the second information, wherein the first frequency resource of the carrier and the second frequency resource of the carrier are different in frequency, and
in response to the sccond frequency resource information or the resource identification information not being received before receiving the second information, the second information is received on the first frequency resource of the carrier.

14. The method according to claim 13, wherein the determining the first transmission resource of the carrier comprises:
determining the first frequency resource of the carrier according to a system parameter, wherein the system parameter comprises at least one of the following: a system bandwidth or a resource scheduling granularity.

15. The method according to claim 13, wherein a physical broadcast channel or a master information block carries first transmission resource information, and the first transmission resource information indicates the first frequency resource of the carrier.

16. The apparatus according to claim 13, wherein a system information block or radio resource control common signaling carries the resource identification information.

17. A non-transitory computer readable storage medium storing computer program codes that, when executed by a computer processor, cause to facilitate:
determining a first frequency resource of a carrier; receiving first information through the first frequency resource of the carrier, wherein the first information comprises control information for scheduling system information; and
receiving second information, wherein the second information comprises control information for scheduling at least one of a paging message or a random access response message,
wherein:
in response to resource identification information being received before receiving the second information, the second information is received on a second frequency resource of the carrier indicated by the resource identification information received before receiving the second information, wherein the first frequency resource of the carrier and the second frequency resource of the carrier are different in frequency,
in response to the resource identification information not being received before receiving the second information, the second information is received on the first frequency resource of the carrier.

18. The non-transitory computer readable storage medium according to claim 17, wherein the determining the first frequency resource of the carrier comprises:
determining the first frequency resource of the carrier according to a system parameter, wherein the system parameter comprises at least one of the following: a system bandwidth or a resource scheduling granularity.

19. The non-transitory computer readable storage medium according to claim 17, wherein a physical broadcast channel or a master information block carries first transmission resource information, and the first transmission resource information indicates the first frequency resource of the carrier.

20. The non-transitory computer readable storage medium according to claim 17, wherein a system information block or radio resource control common signaling carries the resource identification information.

* * * * *

UNITED STATES PATENT AND TRADEMARK OFFICE
CERTIFICATE OF CORRECTION

PATENT NO. : 11,218,272 B2
APPLICATION NO. : 16/696659
DATED : January 4, 2022
INVENTOR(S) : Yu et al.

It is certified that error appears in the above-identified patent and that said Letters Patent is hereby corrected as shown below:

In the Claims

Claim 9: Column 33, Line 56: "A communication method performed for a base station," should read -- A communication method for a base station, --.

Claim 13: Column 44, Lines 51-52: "in response to the second frequency resource information or the" should read -- in response to the --.

Signed and Sealed this
Twenty-first Day of June, 2022

Katherine Kelly Vidal
*Director of the United States Patent and Trademark Office*